United States Patent
Corcoran

(10) Patent No.: US 7,675,897 B2
(45) Date of Patent: Mar. 9, 2010

(54) POWER LINE COMMUNICATIONS SYSTEM WITH DIFFERENTIATED DATA SERVICES

(75) Inventor: Kevin F. Corcoran, Middletown, MD (US)

(73) Assignee: Current Technologies, LLC, Germantown, MD (US)

(*) Notice: Subject to any disclaimer, the term of this patent is extended or adjusted under 35 U.S.C. 154(b) by 1190 days.

(21) Appl. No.: 11/218,576

(22) Filed: Sep. 6, 2005

(65) Prior Publication Data

US 2007/0053352 A1    Mar. 8, 2007

(51) Int. Cl.
*H04J 3/16* (2006.01)
*H04L 12/56* (2006.01)
*H04M 11/04* (2006.01)
*G05B 11/01* (2006.01)

(52) U.S. Cl. .................. 370/349; 370/395.42; 370/412; 370/466; 340/310.11; 340/310.16; 340/538; 340/538.15

(58) Field of Classification Search .................. 370/349, 370/395.42, 412, 466; 340/310.11, 310.16, 340/538, 538.15
See application file for complete search history.

(56) References Cited

U.S. PATENT DOCUMENTS

| | | | |
|---|---|---|---|
| 2,577,731 A | 12/1951 | Berger |
| 3,656,112 A | 4/1972 | Paull |
| 3,942,168 A | 3/1976 | Whyte |
| 3,942,170 A | 3/1976 | Whyte |
| 3,944,723 A | 3/1976 | Fong |
| 3,967,264 A | 6/1976 | Whyte et al. |
| 3,973,087 A | 8/1976 | Fong |
| 4,012,733 A | 3/1977 | Whyte |
| 4,060,735 A | 11/1977 | Pascucci et al. |
| 4,357,598 A | 11/1982 | Melvin, Jr. |
| 4,408,186 A | 10/1983 | Howell |
| 4,479,033 A | 10/1984 | Brown et al. |
| 4,479,215 A | 10/1984 | Baker |

(Continued)

FOREIGN PATENT DOCUMENTS

DE    100 61 584 A1    6/2002

(Continued)

OTHER PUBLICATIONS

"EMETCON Automated Distribution System: Communications Guide", *Westinghouse ABB Power T & D Company Technical Manual 42-6001A* ,, (Sep. 1989), 1-55.

(Continued)

*Primary Examiner*—Alpus H Hsu
(74) *Attorney, Agent, or Firm*—Mel Barnes; Capital Legal Group, LLC

(57) ABSTRACT

A power line communications system that facilitates the provision of differentiated data services is provided. One embodiment of the present invention may include tagging downstream data at an ingress point, such as a point of presence or aggregation point. The tagging of data packets may allow the power line communication network elements such as backhaul points, bypass devices, and repeaters to determine the data type and class of service of each data packet and may allow the network elements to prioritize, queue and transmit the data packets accordingly. Such queuing may employ the use of multiple queues with some queues having different sizes and different weight factors from other queues.

18 Claims, 10 Drawing Sheets

U.S. PATENT DOCUMENTS

| | | | |
|---|---|---|---|
| 4,495,386 A | 1/1985 | Brown et al. |
| 4,638,298 A | 1/1987 | Spiro |
| 4,642,607 A | 2/1987 | Strom et al. |
| 4,675,648 A | 6/1987 | Roth et al. |
| 5,272,462 A | 12/1993 | Teyssandier et al. |
| 5,319,634 A | 6/1994 | Bartholomew et al. |
| 5,559,377 A | 9/1996 | Abraham |
| 5,625,751 A | 4/1997 | Brandwajn et al. |
| 5,625,863 A | 4/1997 | Abraham |
| 5,675,576 A | 10/1997 | Kalampoukas et al. |
| 5,684,450 A | 11/1997 | Brown |
| 5,717,685 A | 2/1998 | Abraham |
| 5,774,526 A | 6/1998 | Propp et al. |
| 5,777,769 A | 7/1998 | Coutinho |
| 5,856,776 A | 1/1999 | Armstrong et al. |
| 5,929,750 A | 7/1999 | Brown |
| 5,933,071 A | 8/1999 | Brown |
| 5,937,342 A | 8/1999 | Kline |
| 5,949,327 A | 9/1999 | Brown |
| 5,952,914 A | 9/1999 | Wynn |
| 5,994,998 A | 11/1999 | Fisher et al. |
| 6,014,386 A | 1/2000 | Abraham |
| 6,040,759 A | 3/2000 | Sanderson |
| 6,144,292 A | 11/2000 | Brown |
| 6,151,330 A | 11/2000 | Liberman |
| 6,157,292 A | 12/2000 | Piercy et al. |
| 6,160,795 A | 12/2000 | Hosemann |
| 6,172,597 B1 | 1/2001 | Brown |
| 6,185,221 B1 | 2/2001 | Aybay |
| 6,275,144 B1 | 8/2001 | Rumbaugh |
| 6,281,784 B1 | 8/2001 | Redgate et al. |
| 6,282,405 B1 | 8/2001 | Brown |
| 6,300,881 B1 | 10/2001 | Yee et al. |
| 6,331,814 B1 | 12/2001 | Albano |
| 6,396,392 B1 | 5/2002 | Abraham |
| 6,404,773 B1 | 6/2002 | Williams et al. |
| 6,407,987 B1 | 6/2002 | Abraham |
| 6,452,482 B1 * | 9/2002 | Cern | 375/258 |
| 6,480,510 B1 | 11/2002 | Binder |
| 6,611,134 B2 | 8/2003 | Chung |
| 6,624,532 B1 | 9/2003 | Davidow |
| 6,646,447 B2 | 11/2003 | Cern et al. |
| 6,668,058 B2 | 12/2003 | Grimes |
| 6,687,574 B2 | 2/2004 | Pietrowicz et al. |
| 6,757,248 B1 | 6/2004 | Li et al. |
| 6,844,809 B2 | 1/2005 | Manis et al. |
| 6,854,059 B2 | 2/2005 | Gardner |
| 6,885,674 B2 * | 4/2005 | Hunt et al. | 370/420 |
| 6,892,243 B1 * | 5/2005 | Skarpness | 709/234 |
| 6,922,135 B2 | 7/2005 | Abraham |
| 6,933,835 B2 | 8/2005 | Kline |
| 6,950,567 B2 | 9/2005 | Kline |
| 6,958,680 B2 | 10/2005 | Kline |
| 6,965,302 B2 * | 11/2005 | Mollenkopf et al. | 370/475 |
| 6,965,303 B2 | 11/2005 | Mollenkopf |
| 6,973,074 B1 | 12/2005 | Maranhao |
| 6,980,090 B2 | 12/2005 | Mollenkopf |
| 6,980,091 B2 | 12/2005 | White et al. |
| 6,985,714 B2 | 1/2006 | Akiyama et al. |
| 6,993,317 B2 | 1/2006 | Belsak, Jr. |
| 6,998,962 B2 | 2/2006 | Cope et al. |
| 7,031,317 B2 | 4/2006 | Negishi et al. |
| 7,042,351 B2 | 5/2006 | Kline |
| 7,046,882 B2 | 5/2006 | Kline |
| 7,064,654 B2 | 6/2006 | Berkman et al. |
| 7,075,414 B2 | 7/2006 | Giannini et al. |
| 7,098,773 B2 * | 8/2006 | Berkman | 370/485 |
| 7,103,240 B2 | 9/2006 | Kline |
| 7,136,936 B2 | 11/2006 | Chan et al. |
| 7,142,094 B1 | 11/2006 | Davidow et al. |
| 7,173,935 B2 | 2/2007 | Lou et al. |
| 7,173,938 B1 | 2/2007 | Davidow |
| 7,187,276 B2 * | 3/2007 | Kline | 340/538.11 |
| 7,194,528 B1 | 3/2007 | Davidow |
| 7,245,212 B2 * | 7/2007 | Cope et al. | 340/538 |
| 7,259,657 B2 | 8/2007 | Mollenkopf et al. |
| 7,301,440 B2 * | 11/2007 | Mollenkopf | 340/310.11 |
| 7,307,511 B2 * | 12/2007 | Kline | 340/310.17 |
| 7,307,512 B2 | 12/2007 | Yaney et al. |
| 7,321,591 B2 | 1/2008 | Daniel et al. |
| 7,333,435 B2 | 2/2008 | Gerkis |
| 7,342,883 B2 | 3/2008 | Szumilas |
| 7,349,422 B2 * | 3/2008 | Duong et al. | 370/447 |
| 7,355,735 B1 | 4/2008 | Sivan et al. |
| 7,382,232 B2 | 6/2008 | Gidge et al. |
| 2001/0033566 A1 | 10/2001 | Grimes |
| 2001/0046288 A1 | 11/2001 | Grimes |
| 2001/0054953 A1 | 12/2001 | Kline |
| 2002/0002040 A1 | 1/2002 | Kline et al. |
| 2002/0015387 A1 | 2/2002 | Houh |
| 2002/0027496 A1 | 3/2002 | Cern et al. |
| 2002/0048368 A1 | 4/2002 | Gardner |
| 2002/0097953 A1 | 7/2002 | Kline |
| 2002/0105413 A1 | 8/2002 | Cern et al. |
| 2002/0110310 A1 | 8/2002 | Kline |
| 2002/0110311 A1 | 8/2002 | Kline |
| 2002/0118101 A1 | 8/2002 | Kline |
| 2002/0121963 A1 | 9/2002 | Kline |
| 2002/0154000 A1 | 10/2002 | Kline |
| 2003/0039257 A1 | 2/2003 | Manis |
| 2003/0054793 A1 | 3/2003 | Manis et al. |
| 2003/0067910 A1 | 4/2003 | Razazian et al. |
| 2003/0129978 A1 | 7/2003 | Akiyama et al. |
| 2003/0160684 A1 | 8/2003 | Cern |
| 2003/0169155 A1 | 9/2003 | Mollenkopf et al. |
| 2003/0184433 A1 | 10/2003 | Zalitzky et al. |
| 2003/0218549 A1 | 11/2003 | Logvinov et al. |
| 2003/0224784 A1 | 12/2003 | Hunt et al. |
| 2003/0227373 A1 | 12/2003 | Lou et al. |
| 2004/0001438 A1 | 1/2004 | Aretz |
| 2004/0001499 A1 | 1/2004 | Patella et al. |
| 2004/0037317 A1 | 2/2004 | Zalitzky et al. |
| 2004/0056734 A1 | 3/2004 | Davidow |
| 2004/0059963 A1 | 3/2004 | Simonnet et al. |
| 2004/0070912 A1 | 4/2004 | Kopp |
| 2004/0075535 A1 | 4/2004 | Propp et al. |
| 2004/0083066 A1 | 4/2004 | Hayes et al. |
| 2004/0110483 A1 | 6/2004 | Mollenkopf |
| 2004/0113756 A1 | 6/2004 | Mollenkopf |
| 2004/0113757 A1 | 6/2004 | White, II et al. |
| 2004/0135676 A1 | 7/2004 | Berkman et al. |
| 2004/0153564 A1 * | 8/2004 | Lakkakorpi | 709/232 |
| 2004/0160990 A1 | 8/2004 | Logvinov et al. |
| 2004/0174851 A1 | 9/2004 | Zalitzky et al. |
| 2004/0223617 A1 | 11/2004 | Corcoran et al. |
| 2004/0227621 A1 | 11/2004 | Cope et al. |
| 2004/0227622 A1 | 11/2004 | Giannini et al. |
| 2004/0233928 A1 | 11/2004 | Pozsgay |
| 2005/0046550 A1 | 3/2005 | Crenshaw et al. |
| 2005/0063422 A1 | 3/2005 | Lazar et al. |
| 2005/0076148 A1 | 4/2005 | Chan et al. |
| 2005/0076149 A1 | 4/2005 | McKown et al. |
| 2005/0111533 A1 | 5/2005 | Berkman |
| 2005/0128057 A1 | 6/2005 | Mansfield et al. |
| 2005/0129097 A1 | 6/2005 | Strumpf et al. |
| 2005/0143083 A1 | 6/2005 | Kwon et al. |
| 2005/0168326 A1 | 8/2005 | White et al. |
| 2005/0169296 A1 | 8/2005 | Katar et al. |
| 2005/0200459 A1 | 9/2005 | White, II |
| 2005/0212688 A1 * | 9/2005 | Chung | 340/870.02 |
| 2005/0285720 A1 | 12/2005 | Cope et al. |
| 2006/0002189 A1 | 1/2006 | Berkman |
| 2006/0034330 A1 | 2/2006 | Iwamura |
| 2006/0049693 A1 | 3/2006 | Abraham et al. |

| | | |
|---|---|---|
| 2006/0077906 A1 | 4/2006 | Maegawa et al. |
| 2006/0082219 A1 | 4/2006 | Gerszberg et al. |
| 2006/0097573 A1 | 5/2006 | Gidge et al. |
| 2006/0146866 A1 | 7/2006 | Stephan et al. |
| 2006/0176832 A1 | 8/2006 | Miceli |
| 2006/0192672 A1 | 8/2006 | Gidge et al. |
| 2006/0220833 A1 | 10/2006 | Berkman |
| 2006/0291575 A1 | 12/2006 | Berkman et al. |
| 2007/0002771 A1 | 1/2007 | Berkman et al. |
| 2007/0002772 A1 | 1/2007 | Berkman et al. |
| 2007/0025244 A1 | 2/2007 | Ayyagari et al. |
| 2007/0053352 A1 | 3/2007 | Cocoran |
| 2007/0076505 A1 | 4/2007 | Radtke et al. |
| 2007/0133552 A1 * | 6/2007 | Kubo et al. ............ 370/395.2 |
| 2007/0201494 A1 | 8/2007 | Lou et al. |
| 2007/0236340 A1 | 10/2007 | White, II |
| 2007/0291907 A1 | 12/2007 | Corcoran |
| 2009/0097408 A1 | 4/2009 | Cocoran |

FOREIGN PATENT DOCUMENTS

| | | |
|---|---|---|
| DE | 100 59 564 A1 | 9/2002 |
| DE | 100 48 348 C2 | 11/2002 |
| DE | 101 47 916 C1 | 5/2003 |
| DE | 101 47 915 C1 | 6/2003 |
| EP | 0 470 185 B1 | 11/1995 |
| EP | 0 822 721 A2 | 2/1998 |
| EP | 0 822 721 A3 | 2/1998 |
| EP | 0 913 955 A2 | 5/1999 |
| EP | 1 217 760 A1 | 6/2002 |
| EP | 1 021 866 B1 | 10/2002 |
| EP | 1 251 646 A2 | 10/2002 |
| GB | 1 548 652 | 7/1979 |
| GB | 2 293 950 A | 4/1996 |
| GB | 2 335 335 A | 9/1999 |
| WO | WO-84/01481 A1 | 4/1984 |
| WO | WO-02/37712 A1 | 5/2002 |
| WO | WO-03/009083 A2 | 1/2003 |
| WO | WO-03/009083 A3 | 1/2003 |
| WO | WO-03/010896 A1 | 2/2003 |
| WO | WO-03/030396 A2 | 4/2003 |
| WO | WO-03/039022 A1 | 5/2003 |

OTHER PUBLICATIONS

"HomePlug 1.01 Specification", *HomePlug Powerline Alliance*, (Dec. 1, 2001),1-39.

"HomePlug Initital Draft Medium Interface Specification", *HomePlug Powerline Alliance*, (May 19, 2000),1-109.

"HomePlug Initital Draft Medium Interface Specification", *HomePlug Powerline Alliance*, (Jul. 27, 2000),1-109.

"HomePlug Powerline Alliance,", *HomePlug 0.5 Draft Medium Interface Specification,*, (Nov. 28, 2000),1-133.

Chen, Y-F , et al., "Baseband Transceiver Design of a 128-Kbps Power-Line Modem for Household Applications", *IEEE Transactions on Power Delivery*, (2002),338-344.

Gutzwiller, F W., et al., "Homenet: A Control Network for Consumer Applications", *IEEE Transactions on Consumer Electronics*, (Aug. 1983),297-304.

Kim, W-O , et al., "A Control Network Architecture Based on EIA-709.1 Protocol for Power Line Data Communications", *IEEE Transactions on Consumer Electronics*, (2002),650-655.

Lokken, G , et al., "The Proposed Wisconsin Eectric Power Company Load Management System Using Power Line Carrier Over Distribution Lines", *1976 National Telecommunications Conference, IEEE*, (1976),2.2-12.2-3.

Onunga, J , et al., "Distribution Line Communications Using CSMA Access Control with Priority Acknowledgements", *IEEE Transactions on Power Delivery*, (Apr. 1989),878-886.

Yoshitoshi, M , et al., "Proposed Interface Specifications for Home Bus", *IEEE Transactions on Consumer Electronics*, (Aug. 1986),550-557.

Feduschak, N A., "Waiting in the Wings: Is Powerline Technology Ready to Compete with Cable?", www.cabletoday.com/ic2/archives/0301/0301powerline.htm, (Mar. 2001),1-5.

Barstow, J M., "A Carrier Telephone System for Rural Service", *AIEE Transactions*, (1947),301-307.

Jee, G et al., "Demonstration of the Technical Viability of PLC Systems on Medium- and Low-Voltage Lines in the United States", *IEEE Communication Magazine*, (May 2003),108-112.

Dostert, K "EMC Aspects of High Speed Powerline Communications", *Proceedings of the 15th International Wroclaw Symposium and Exhibition on Electromagnetic Capability*, (Jun. 27-30, 2000),98-102.

"Outlook Conference 2004: Amperion Deployment Overview", *Primen Conference*, (May 7, 2004),1-10.

Dostert, K "Powerline Communications, Ch. 5", *Powerline Communications*, (2001),286, 288-292.

Horiguchi, Akira "High Speed Power Line Communication Technology", *Mitsubishi Electric Advance vol. 109*, (Mar. 2005),1-27.

"White Paper on Medium Voltage Powerline Communication (PLC) Networks", *CIGRE SC D2 WG 14, Broadband PLC*, (Mar. 2005),1-58.

* cited by examiner

POWER LINE COMMUNICATIONS SYSTEM WITH DIFFERENTIATED DATA SERVICES

FIELD OF THE INVENTION

The present invention generally relates to communications over a power distribution system and more particularly to the provision of differentiated data services in power line communication systems.

BACKGROUND OF THE INVENTION

Well-established power distribution systems exist throughout most of the United States, and other countries, which provide power to customers via power lines. With some modification, the infrastructure of the existing power distribution systems can be used to provide data communication in addition to power delivery, thereby forming a power line communication system (PLCS). In other words, existing power lines, that already have been run to many homes and offices, can be used to carry data signals to and from the homes and offices. These data signals are communicated on and off the power lines at various points in the power line communication system, such as, for example, near homes, offices, IP network service providers, and the like.

In one example PLCS, a backhaul point forms the gateway between the power line and conventional telecommunications medium and communicates with a plurality of downstream communication devices such as transformer bypass devices. The backhaul point and its plurality of communication devices (and their associated user devices) form a PLCS subnet. In some systems, a power line repeater may be added to the power line between the backhaul point and its communications devices.

As the use of the internet becomes more and more prevalent, it has been used to transmit a wide variety of different types of data, e.g., E-mail, web page, voice, music, video, gaming, etc. Each of these different data types may have different performance and priority requirements. For example, E-mail data typically can tolerate a large packet latency and, therefore, can be communicated with packets having a low priority. On the other hand, a high quality voice service may require low packet latency, but can tolerate the loss of some packets here and there. Gaming services typically require low packet latency and further do not tolerate packet loss very well.

As a result there remains a need to provide differentiated data communication capability over a PLCS. The differentiated data communication capability of the present invention allows different types of data to be communicated over a PLCS network with different, but acceptable performance parameters for each type of data. There also remains a need for the provision of different classes of service within a given type of data service. These and other advantageous may be provided by various embodiments of the present invention.

SUMMARY OF THE INVENTION

The present invention provides a PLCS that allows for the provision of differentiated data services. One embodiment of the present invention may include tagging downstream data at an ingress point, such as a point of presence or aggregation point. The tagging of data packets may allow the power line communication network elements such as backhaul points, bypass devices, and repeaters to determine the data type and class of service of each data packet and may allow the network elements to prioritize, queue and transmit the data packets accordingly. Such queuing may employ the use of multiple queues with some queues having a weight factor different from other queues.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details are set forth, such as particular networks, communication systems, computers, PLCS, terminals, devices, components, techniques, data and network protocols, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, PLCS, terminals, devices, components, techniques, data and network protocols, software products and systems, operating systems, development interfaces, and hardware are omitted so as not to obscure the description of the present invention.

System Architecture and General Design Concepts

Figure 1:
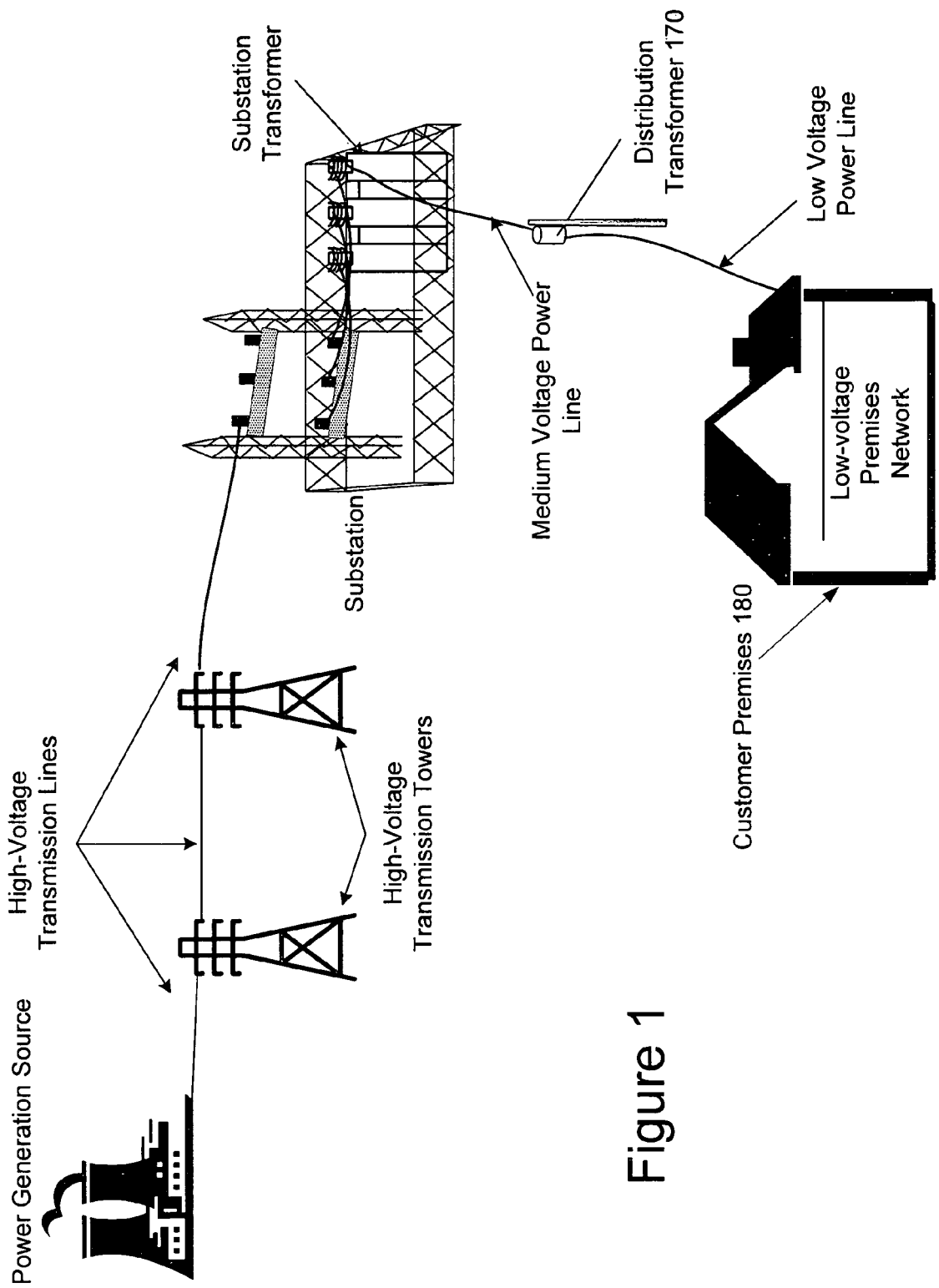
FIG. 1 is a diagram of an exemplary overhead power distribution system.

FIG. 1 illustrates an example power distribution systems that includes components for power generation, power transmission, and power delivery. A transmission substation typically is used to increase the voltage from the power generation source to high voltage (HV) levels for long distance transmission on HV transmission lines to a substation. Typical voltages found on HV transmission lines range from 69 kilovolts (kV) to in excess of 800 kV.

In addition to HV transmission lines, power distribution systems include medium voltage (MV) power lines and low voltage (LV) power lines. MV may range from about 1000 V to about 100 kV and LV typically ranges from about 100 V to about 240 V. Transformers are used to convert between the respective voltage portions, e.g., between the HV section and the MV section and between the MV section and the LV section. Transformers have a primary side for connection to a first voltage (e.g., the MV section) and a secondary side for outputting another (usually lower) voltage (e.g., the LV section). Such transformers are often referred to as distribution transformers or a step down transformers, because they "step down" the voltage to some lower voltage. Transformers, therefore, provide voltage conversion for the power distribution system. Thus, power is carried from substation transformer to a distribution transformer over one or more MV power lines. Power is carried from the distribution transformer to the customer premises via one or more LV power lines.

In addition, a distribution transformer may function to distribute one, two, three, or more phase power signals to the customer premises, depending upon the demands of the user. In the United States, for example, these local distribution transformers typically feed anywhere from one to ten homes, depending upon the concentration of the customer premises in a particular area. Distribution transformers may be pole-top transformers located on a utility pole, pad-mounted transformers located on the ground, or transformers located under ground level. The present inventions may be employed in overhead or underground PLCSs.

Power Line Communication System

The present invention relates to the provision of differentiated services on a PLCS network. Thus, the following brief description provides one example PLCS with which the present invention may be used. The present invention may be used with other types of PLCS as well.

Figure 2:
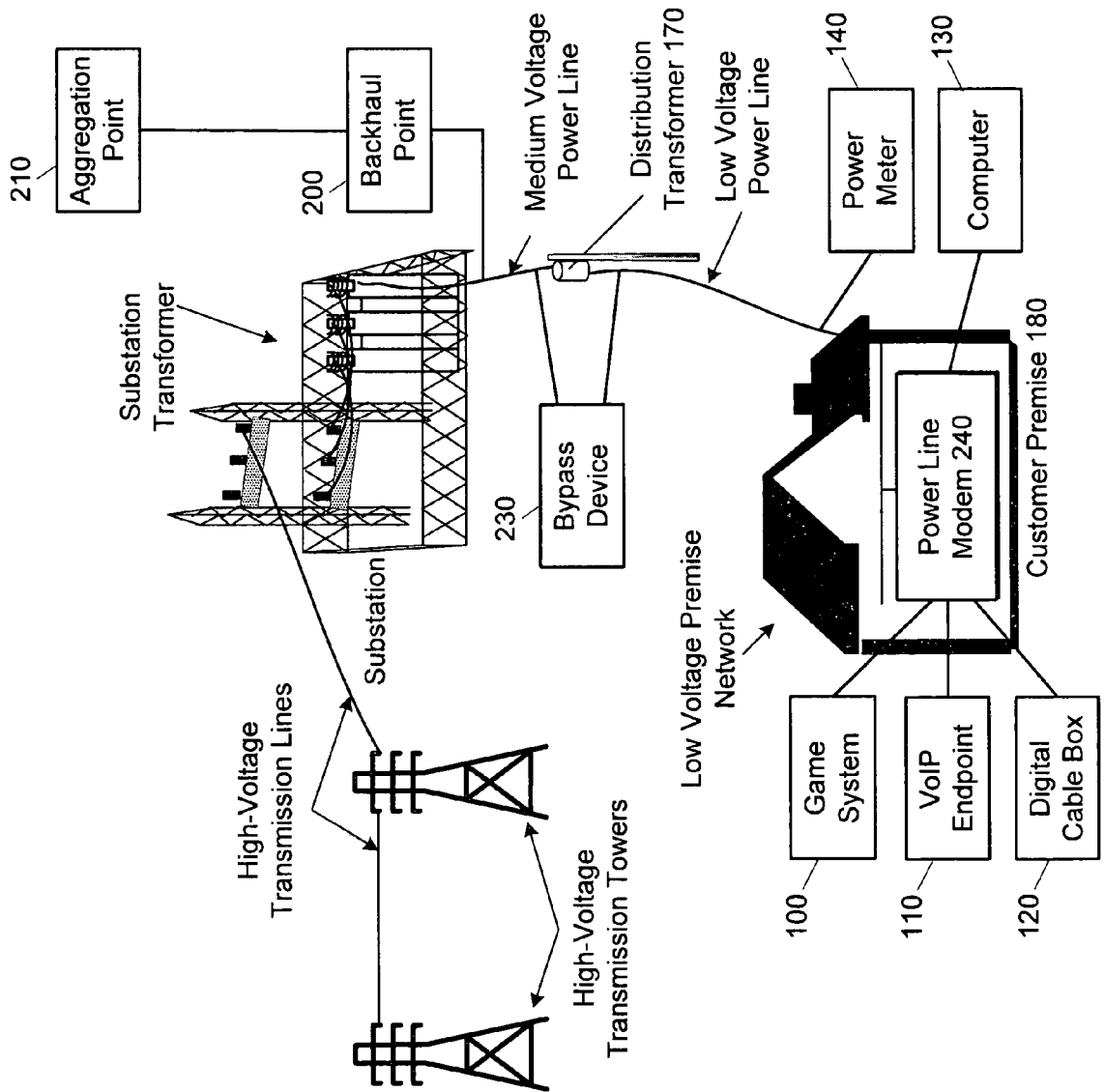
FIG. 2 illustrates an example implementation of a PLCS providing differentiated services according to an example embodiment of the present invention.

A portion of an example overhead PLCS is shown in FIG. 2 and includes one or more communications devices, which may be transformer bypass devices (bypass devices). In this illustration, only one communications device (bypass device 230) is depicted. However, in practice five, ten, or more communications devices may form part of a single PLCS subnet. The communications device in this embodiment is a bypass device 230 that is the gateway between the LV power line subnet (i.e., the LV power lines and the devices that are communicatively coupled to the LV power lines) and the MV power line.

In this embodiment, the bypass device 230 provides communications services for the user devices, which may include security management, routing of IP network protocol (IP) packets, filtering data, access control, service level monitoring, service level management, signal processing and modulation/demodulation of signals transmitted over the power lines.

In other embodiments, a device coupled to the MV line may communicate with the customer premises 180 using a wireless connection, coaxial cable, fiber optic cable, twisted pair (digital subscriber line or DSL), Ethernet or any other suitable link. These connections to the customer premises 180 may then connect to a network within the customer premises, for example, an LV power line network, a coaxial cable network, twisted pair, an Ethernet network, or a wireless network. In one example described herein, the bypass device is coupled to an external low voltage power line, which is connected to the internal LV power line network of the customer premises to which a power line modem is coupled.

In this example PLCS, the PLCS subnet also includes a backhaul point 200. The backhaul point 200 is an interface and gateway between the power line and a non-power line telecommunications network. One or more backhaul points 200 typically are communicatively coupled to an aggregation point (AP) 210 that may be coupled to (or form part of) a point of presence (POP) to the IP network (e.g., the Internet). The backhaul point 200 may be connected to the AP 210 using any available mechanism, including fiber optic conductors, T-carrier, Synchronous Optical Network (SONET), or wireless techniques. Thus, the backhaul point 200 includes a transceiver suited for communicating through the non-power line telecommunications medium (hereinafter the "backhaul link").

The AP 210 may include an Internet Protocol (IP) network data packet router and may be directly connected to an IP network backbone thereby providing access to the IP network (and be a POP). Alternatively, the AP 210 may be connected to a POP, which provides access to the IP network, or other communication network. The AP 210 or the POP may provide an interface between the PLCS and the external network. Depending on the configuration of the PLCS, a plurality of APs 210 may be connected to a POP which provides the external network access. The POP (or AP 210 as the case may be) may route voice and general data traffic to and from a particular external network. The routing of packets may be determined by any suitable means such as by including information in the data packets to determine whether a packet is voice. The IP network may handle voice and data packets differently, so as to meet the latency requirements for voice packets.

In some PLCS embodiments, there may a distribution point (not shown) between the backhaul point 200 and the AP 210. The distribution point, which may comprise a router, may be coupled to a plurality of backhaul points 200 and provides routing functions between its backhaul points 200 and its AP 210. In one example embodiment, a plurality of backhaul points 200 are connected to each distribution point and each distribution point (of which there is a plurality) is coupled to the AP 210, which provides access to the IP network and other networks.

The PLCS also may include a power line server (PLS) that is a computer system with memory for storing a database of information about the PLCS and includes a network element manager (NEM) that monitors and controls the PLCS. The PLS allows network operations personnel to provision users and network equipment, manage customer data, and monitor system status, performance and usage. The PLS may reside at a remote operations center to oversee a group of communication devices via the IP network. The PLS may provide an IP network identity to the network devices by assigning the devices (e.g., user devices, bypass devices 230, (e.g., the LV modems and MV modems of bypass devices), LV and MV repeaters, backhaul points 200, and AP 210) an IP address and storing the IP address and other device identifying information (e.g., the device's location, address, serial number, etc.) in its memory. In addition, the PLS may approve or deny user devices authorization requests, command status reports and measurements from the bypass devices, repeaters, and backhaul points, and provide application software upgrades to the communication devices (e.g., bypass devices, backhaul points, repeaters, and other devices). The PLS, by collecting electric power distribution information and interfacing with utilities' back-end computer systems may provide enhanced distribution services such as automated meter reading, outage detection, load balancing, distribution automation, Volt/Volt-Amp Reactance (Volt/VAr) management, and other similar functions. The PLS also may be connected to one or more APs and/or core routers directly or through the IP network and therefore can communicate with any of the bypass devices, repeaters, user devices, backhaul points and other network elements through the respective AP and/or core router. The PLS may also transmit subscriber information, such as whether a particular data service is enabled for a user (e.g., voice), the level of service for each data service for a user (e.g., for those data services having more than one level of service), address information (e.g., IP address and/or media access control (MAC) addresses for devices) of the subscribers, and other information.

At the user end of the PLCS, data flow originates from a user device, which provides the data to a power line modem (PLM) 240, which is well-known in the art.

Various electrical circuits within the customer's premises distribute power and data signals within the customer premises. The customer draws power on demand by plugging a device into a power outlet. In a similar manner, the customer may plug the power line modem into a power outlet to digitally connect user devices to communicate data signals carried by the power wiring. The PLM 240 thus serves as an interface for user devices to access the PLCS. The PLM 240 can have a variety of interfaces for customer data appliances. For example, a PLM 240 can include a RJ-11 Plain Old Telephone Service (POTS) connector, an RS-232 connector, a USB connector, a 10 Base-T connector, RJ-45 connector, and the like. In this manner, a customer can connect a variety of user devices to the PLCS. Further, multiple PLMs 240 can be plugged into power outlets throughout the customer premises, with each PLM 240 communicating over the same wiring internal to the customer premises.

The PLM 240 may be connected to (or integrated into) any device capable of supplying data for transmission (or for receiving such data) including, but not limited to a computer, a telephone, a telephone answering machine, a fax, a digital cable box (e.g., for processing digital audio and video, which may then be supplied to a conventional television and for transmitting requests for video programming), a video game, a stereo, a videophone, a television (which may be a digital television), a video recording device, a home network device, a utility meter, or other device. The PLM 240 transmits the data received form the user device through the customer LV power line to a bypass device 230 and may provide data received from the LV power line to the user device. Finally, the functions of the PLM 240 may be integrated into a smart utility meter such as a gas meter, electric meter, water meter, or other utility meter to thereby provide automated meter reading (AMR).

The bypass device 230 typically transmits the data to the backhaul point 200, which, in turn, transmits the data to the AP 210. The AP 210 then transmits the data to the appropriate destination (perhaps via a core router), which may be a network destination (such as an IP network address) in which case the packets are transmitted to, and pass through, numerous routers (herein routers are mean to include both network routers and switches) in order to arrive at the desired destination.

The backhaul point 200 may be coupled to each phase of the MV power line. In practice, however, this may not be necessary. In some embodiments, such as those communicating through overhead MV conductors, data signals may couple across the MV conductors. In other words, data signals transmitted on one MV phase conductor may be present on all of the MV phase conductors due to the data coupling between the conductors. As a result, the backhaul point 200 may not need to be physically connected to all three phase conductors of the MV cable and transmission from the backhaul point 200 when coupled to one MV phase conductor will be received by the bypass devices 230 connected to the other MV phase conductors and vice versa. In some embodiments, however, which may include underground MV cables, it may be desirable to couple the backhaul point 200 to all of the available phase conductors.

A detailed description of an example PLCS, its components and features is provided in U.S. patent application Ser. No. 11/091,677 filed Mar. 28, 2005, entitled "Power Line Repeater System and Method," which is hereby incorporated by reference in its entirety. A detailed description of another example PLCS, its components and features is provided in U.S. patent application Ser. No. 10/973,493 filed Oct. 26, 2004, entitled "Power Line Communications System and Method of Operating the Same," which is hereby incorporated by reference in its entirety. The differentiated services of the present invention may be used with power line communication (PLC) networks as described in the above patent applications, which include both underground and overhead PLCS. Thus, the invention is not limited to a particular PLCS, PLCS architecture, backhaul link, topology, data types, data services, or application.

FIG. 2 depicts a plurality of user devices that may use the PLCS for communication and which may benefit from the provision of differentiated services. User devices connected to the PLCS (e.g., via a dedicated PLM or shared PLM and router) may include VoIP endpoints 110, game systems 100, digital cable boxes 120, computers 130, power meters 140, security systems (not shown), alarm systems (e.g., fire, smoke, carbon dioxide, etc.) (not shown), stereo systems(not shown), televisions(not shown), and fax machines(not shown). These devices may have power line modem functionality built in or may connect directly or indirectly to a PLM 240. Each of these devices may have different network service requirements. Typically, however, the devices will be categorized into one of a plurality of groups, wherein each group corresponds to a differentiated data service of the network.

For example, high quality voice (Voice over Internet Protocol (VoIP)) data requires low latency, low jitter, and medium bandwidth and may tolerate some lost packets. Gaming data may require low latency, low jitter, low packet loss, and low to medium bandwidth both upstream and downstream. Video data may require relatively low latency, no or low jitter, low packet loss, and high bandwidth. Video data is typically one way (downstream), but in some cases may have interactive functionality in which case the upstream bandwidth requirements typically are low. Audio data typically has substantially the same requirements as video, but with lower bandwidth. In other applications, the upstream and downstream bandwidths for the audio or video may be substantially symmetrical. Enhanced power distribution services (EPDS) for utility applications, such as, for example, communicate with a power meter, require low bandwidth, high reliability, and low packet loss, but may tolerate relatively high latency and jitter. Thus, in summary, each type of data (e.g., the data associated which each device) may be accorded one the plurality of data services available via the power line communication system.

In addition, each type of data service may also include different classes of service. For example, voice data service may have the following service classes: business; premium residential; and normal residential—each with decreasing quality of service (QOS) and each class of service being provided a having a service level. Video data service may be offered as high definition, DVD quality, or low quality depending upon the users needs and desires. Each of these differentiated data services may have different costs and each class of service within a particular differentiated data service may also have a different cost.

Referring to FIG. 2, in the customer premises the PLM 240 interfaces between user devices the low voltage power line. The PLM 240 receives an input data stream and then formats, modulates, and transmits the data in a signal suitable for transmission along the low voltage power line. Various data formats and modulation schemes may be used. For example, the HomePlug® Alliance has developed a standard (HomePlug 1.0) for communicating over low voltage power lines. For convenience, the system will be described using the HomePlug standard (which may include HomePlug 1.0 or HomePlug A/V), but other standards and schemes may be used for communication along the low voltage power line. Because multiple PLMs 240 may be interconnected by low voltage lines, the line is shared and data transmission needs to be managed to avoid transmission collisions. The HomePlug standard uses various mechanisms to manage transmission on the line in a distributed manner. Also, the HomePlug standard uses a four level priority scheme (CA0, CA1, CA2, and CA3) to allow higher priority traffic first access to the power line.

Differentiated Services on a Power Line Communication System

Differentiated data services allow a communication system to accommodate different types of data and to meet the various requirements for each type of data type. As discussed, different types of data may have different requirements for data latency, data jitter, bandwidth, packet loss, reliability, etc. Therefore, each data type may require unique or specific handling across the network. Additionally, different data types with similar requirements may be handled the same or similarly across the network. Various elements of the PLCS may include functionality for facilitating this handling.

As discussed, examples of different types of data may include voice data, PLC management data, audio data, video data, gaming data, and general data (e.g., web page data, email data). Handling of the different types of data may include differentiating data based upon relative priority, reserving network services for a data type, and/or limiting a data type to a maximum bandwidth. Also, various classes of service for a given type of data may be offered with different QOS levels. Differentiated data services may be implemented by tagging data and using multiple data traffic queues, queuing algorithms, congestion avoidance algorithms, and traffic shaping, policing, and rate limiting algorithms.

Figure 3:
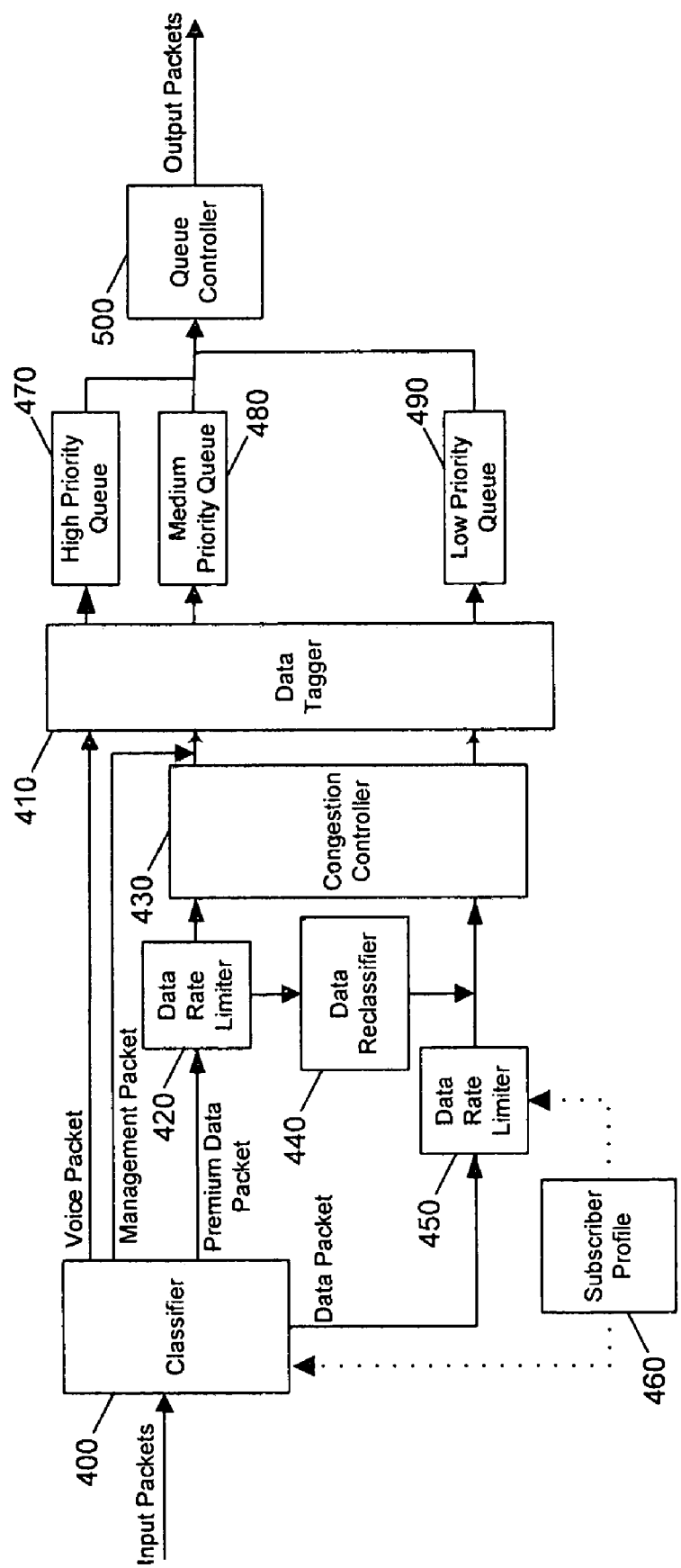
FIG. 3 illustrates a functional block diagram of an example embodiment for implementing the processing of data packets in accordance with an example embodiment of the present invention.

FIG. 3 shows a functional block diagram of an implementation for handling data packets in a bypass device 230 to provide differentiated data services in a PLCS in accordance with an example embodiment. In addition, depending on the PLCS, this implementation may also be implemented in a backhaul point, AP, LV repeater, MV repeater, and/or POP. In this example embodiment, four different data services are provided. As will be discussed in more detail below, the functional blocks of FIG. 3 may be provided via software present in the controller or router of the bypass device 230 or other device. Thus, the bypass device 230 may include functional components of a classifier 400, data tagger 410, first data rate limiter 420, congestion controller 430, data reclassifier 440, second data rate limiter 450, subscriber profile 460, high priority queue 470, medium priority queue 480, low priority queue 490, and queue controller 500.

Data tags allow data packets to be differentiated, which may permit each type of data to be handled differently or to be grouped (where the handling requirements are similar) and each group be handled differently. Also, such data tagging may provide an indication of the class of service for the data type. The data tags may also include priority information. Various priority levels may be defined and applied to different types of data and classes of service. It also is possible for different types of data to have the same priority, in which case they will be handled the same throughout the network.

The following description is in the context of the bypass device 230 receiving packets from a user device. It will be evident to one skilled in the art, however, that the functional blocks of FIG. 3 will function similarly regardless of from where the packet is received or the device implementing the functions. In other words, the functions of FIG. 3 may process data transmitted to the bypass device from the MV power line, to a BP from the MV power line, to the BP from an upstream device, and/or to an AP or POP from an external network. Referring to FIG. 3, the classifier 400 may receive data packets transmitted from a low voltage repeater or the user device (e.g., via the low voltage power line or wirelessly) or from the backhaul point or MV repeater (e.g., via the medium voltage power line). In this example, there are four different data types and the classifier 400 classifies the data packets as voice data, management data, premium data, or general data packets. Other embodiments may have any number of different classifications. In this embodiment the classifier 400 must be able to identify the type of data in the data packet in order to classify the data packet.

In one example embodiment, each user device may be configured prior to communicating via the PLCS. Configuration may be accomplished via preprogramming (e.g., during manufacture) or when the device registers to use the network (e.g., each time device is connected to the network). In one embodiment, the user device's Internet Protocol (IP) address may be stored in memory of the bypass device and associated with a type of data. The address and data type information may be transmitted to the bypass device 230 from the PLS (e.g., via the MV power line) or from the user device or may be assigned to the device by the bypass device 230, backhaul point, or power line server. For example. if the user device is a IP telephone or analog telephone adapter (ATA), the device's IP address may be assigned by the PLS and transmitted to bypass device 230 along with information identifying the IP address as transmitting voice data type. The information may be stored in the memory of the bypass device 239. The IP addresses of voice devices may be stored at all the ingress points to the PLC network and, therefore, may also be stored at the POP or aggregation point as well. Consequently, when the bypass device 230 receives a data packet, the classifier 400 may inspect the IP source address (for upstream data) or destination address (for downstream data) to determine appropriate the data type and processing. Similarly, when the POP receives a packet, it may inspect the IP destination address (for downstream data) or source address (for upstream data) to determine the data type and appropriate processing. Thus, in this embodiment, the ingress points to the PLCS (e.g., the bypass device 230 and POP) may have the IP addresses of all devices on their subnet stored therein (i.e., the LV subnet for the bypass devices 230 and the PLCS sub-network for the POP) as well as the type of data associated with that device (e.g., if the device is to be accorded a higher than default priority). Thus, the IP addresses of all the ATA's may be stored in their associated bypass devices 230. (Note that the user devices may be uniquely identified originally by their MAC address). The network (PLS and bypass device) may store an association between the user device's MAC address(es) and the IP addresses that are assigned and subsequently uses the IP address as a key classification. In an alternate embodiment, the system may use the user device's MAC address (e.g. ATA MAC address) for classification. Similarly, the determination of whether the data packet is a management data packet may be accomplished by comparing the source IP address (for downstream data) with the IP address of those addresses known to transmit management packets (e.g., the IP address of the PLS) and by inspecting the destination IP address (for upstream data packets) to determine if the packet is being transmitted to device known to a receive management data packets. In other embodiments, other information may be used to identify the type of data packets such as a MAC addresses, which may be suitable when the user device includes an integrated PLM.

As shown in FIG. 3, after being identified by the classifier 400 the voice data packets and management data packets may be supplied to the data tagger 410 to be tagged as voice and management data packets, respectively. This tagging may include setting the DiffServ (sometimes referred to as DiffServ Control Points) tag appropriately (e.g., setting the DiffServ tag to EF for voice packets) and/or setting the IEEE 802.1p priority tag appropriately (e.g., set it to priority 6 for voice data packets).

Premium and general data packets may similarly be identified based on the source and/or destination IP address. However, any suitable method of identifying the different types of data packets may be employed.

The premium data packets are supplied to the first data rate limiter 420, which limits the data rate of the premium data packets. The first data rate limiter 420 may pass its packets to the congestion controller 430. However, data packets exceeding the allowed data rate limit may be sent to a data reclassifier 440, which reclassifies those data packets to a lower priority class, which are then provided to the congestion controller 430.

The second data rate limiter 450 receives general data packets and limits these data packets according to a data rate assigned to the subscriber transmitting or receiving the data packet, which is stored in and provided by the subscriber profile 460.

As discussed, both the premium data packets and general data packets are sent to data rate limiters 420 and 450, respectively, in order to limit the amount of bandwidth that these types of data consume. For example, peer-to-peer (P2P) systems allow users to share various large files such as media files. P2P systems may consume large amounts of bandwidth, even when the user is not at their computer. In order to prevent P2P usage from overwhelming the PLCS and degrading the quality of high QOS data traffic, P2P usage may be limited to a fixed rate based upon bandwidth that the user or that device is allocated. For example, if the limit is set 25%, a user with a two megabits per second (Mbps) service would be limited to 500 kilobits per second (Kbps) of P2P traffic. These limits may be set by the PLS and transmitted to the bypass device, repeater, POP, or backhaul for storage in memory (e.g., in memory allocated to the subscriber profiler 460) and enforced at the data rate limiters 420, 450. The rate limiting may be carried out using algorithms such as token bucket or leaky bucket. Other rate limiting algorithms may be used as Well. Further, any of the data types and associated classes of service described herein or others may be rate limited.

A subscriber profile 460 may be used to determine the rate limits and related subscription information to be used by the data rate limiter 450 as each subscriber may have different limits based upon their specific subscription. This subscription profile 460 may contain information identifying the user devices associated with the subscription (e.g., media access control (MAC) addresses of power line modems and/or IP address of user devices, and the data type of the device, etc.). The data packets from these devices may be used to determine whether the user (or the user device) has exceeded the allowed data rate for their (its) subscription. The PLS transmits to the bypass devices 230 the information needed in the subscription profile 460. In a like manner the backhaul point 200, repeaters, AP and/or the POP may receive this information and limit the bandwidth used by a subscriber or a device in the downstream or upstream direction.

In network configurations whereby high priority data traffic (e.g., voice, video, or gaming) is assigned a high priority, it may be possible that a malicious user may spoof high priority data traffic to improperly achieve high priority handling for low priority data traffic. In order to prevent this from occurring, high priority data may be rate limited. For example, the voice data traffic may be limited to 100 Kbps to allow for use of typical voice codecs while being at a low enough rate to be of little value to a malicious data user that desires a higher data rate (e.g., for streaming video or audio). Similar limits may be included for other high priority types of data. This functionality may be implemented by an additional data rate limiter (not shown) receiving the voice data packets from the output of the classifier 400.

The congestion controller 430 receives the rate limited premium data packets and general data packets in order to reduce network congestion. Congestion at a network element may cause degradation of the network and prevent the provision of differential data services. Congestion avoidance in general is the early detection of the onset of congestion, or events that will lead to congestion, before the congestion event actually occurs. For example, in TCP/IP networks there are a few methods available that allow a network to provide feedback to a data source to indicate the onset of congestion. The TCP protocol does implicitly interpret packet loss as possibly having been caused by congestion and does implement a back-off mechanism that can be used as part of a congestion avoidance mechanism.

A function known as Random Early Discard (RED) is a packet dropping mechanism that actuates the TCP back-off mechanism and simultaneously attempts to avoid a phenomenon known as global synchronization. In the situation where many TCP hosts have their back-off mechanism actuated simultaneously, they all slow down together, reducing network utilization, and they all speed back up again simultaneously, leading to another congestion event and another simultaneous back-off. The RED mechanism begins to randomly drop packets before queues fill, allowing some hosts to be notified in advance of a catastrophic congestion event, thus desynchronizing those hosts in time and hopefully avoiding the catastrophic congestion event entirely.

There are many varieties of RED, which is based on the TCP session flow control mechanism. An example RED algorithm may include the following steps: calculating the average queue size; if the average is less than the minimum queue threshold, the arriving packet is queued; if the average is between the minimum queue threshold and the maximum threshold, the packet is either dropped or queued, depending on the packet drop probability; and if the average queue size is greater than the maximum threshold, the packet is automatically dropped. WRED is substantially similar to RED except that when it is time to drop a packet, it will weigh the minimum threshold according to the priority of the arriving packet before making the decision. This reduces the chance of packet drop for the premium service (higher priority services). The present invention may use the WRED function implemented in the controller or router of the network element to reduce or control congestion.

Other varieties of RED algorithms which also may be used in the present invention including RED-in-out (RIO), flow RED (FRED), and RED with penalty box. These RED algorithms are well known in the art.

The congestion controller supplies its data packets to the data tagger 410. The data tagger 410 may tag data packets according to the packet's data type and class of data, which may include setting the DiffServ priority tag, which is a layer 3 tag, and/or the IEEE 802.1p priority tag, which is a layer 2 tag.

DiffServ tags are included in the Internet Protocol header. HomePlug devices, however, ignore the DiffServ tags. Instead, Homeplug devices may receive an Ethernet data packet and, based on the packets IEEE 802.1p priority, the modem sets the HomePlug Channel Access (CA) priority of the outgoing power line packet to CA0, CA1, CA2, or CA3, with CA3 being the highest priority and CA1 being the default priority. As is known in the art, IEEE 802.1p priority levels include (in descending order of priority) Expedited Forwarding (EF), Assured Forwarding (AF), and Best Effort (BE). In one embodiment, voice data packets may be given an EF DiffServ tag, management data packets an AF DiffServ tag, and depending on the subscriber's subscription level, general data packets may get an AF DiffServ tag or a BE DiffServ tag.

After tagging the data packet, the data tagger 410 then provides the data packet to the appropriate high, medium, or low priority queues 470, 480, 490. The queue controller 500 then uses rules to select data packets from the queues 470, 480, 490 for transmission as output packets.

Typically as data moves from one segment of a communication network to another segment, the data is queued in a network element such as the backhaul point, bypass device, repeater, AP or POP. These packets may then be processed and transmitted along the appropriate network segment attached to the network element.

For example, data packets in the queue have an associated priority. Higher priority data packets may be transmitted by the network element before lower priority data packets. One problem with a single data packet queue is that even high priority data packets, such as voice data packets, may be lost if the single queue is full and cannot accept additional packets. One way to solve this problem is to have multiple data packet queues. Each type of data packet may be assigned to a data packet queue (which may or may not be different from the queue assigned to other types of data). In the case of priority tagging, each queue may correspond to a different priority or priority ranges. Typically, queues have a finite size, which is a measure of the amount of data that the queue can hold before being full (and can hold no more data). Thus, even if a low priority queue is full, incoming high priority data packets may arrive and be placed in a high priority data queue and will generally not be lost. Therefore, after data is tagged by data tagger 410, the data packet is placed in one of three queues: high priority queue 470, medium priority queue 480, and low priority queue 490.

Figure 4:
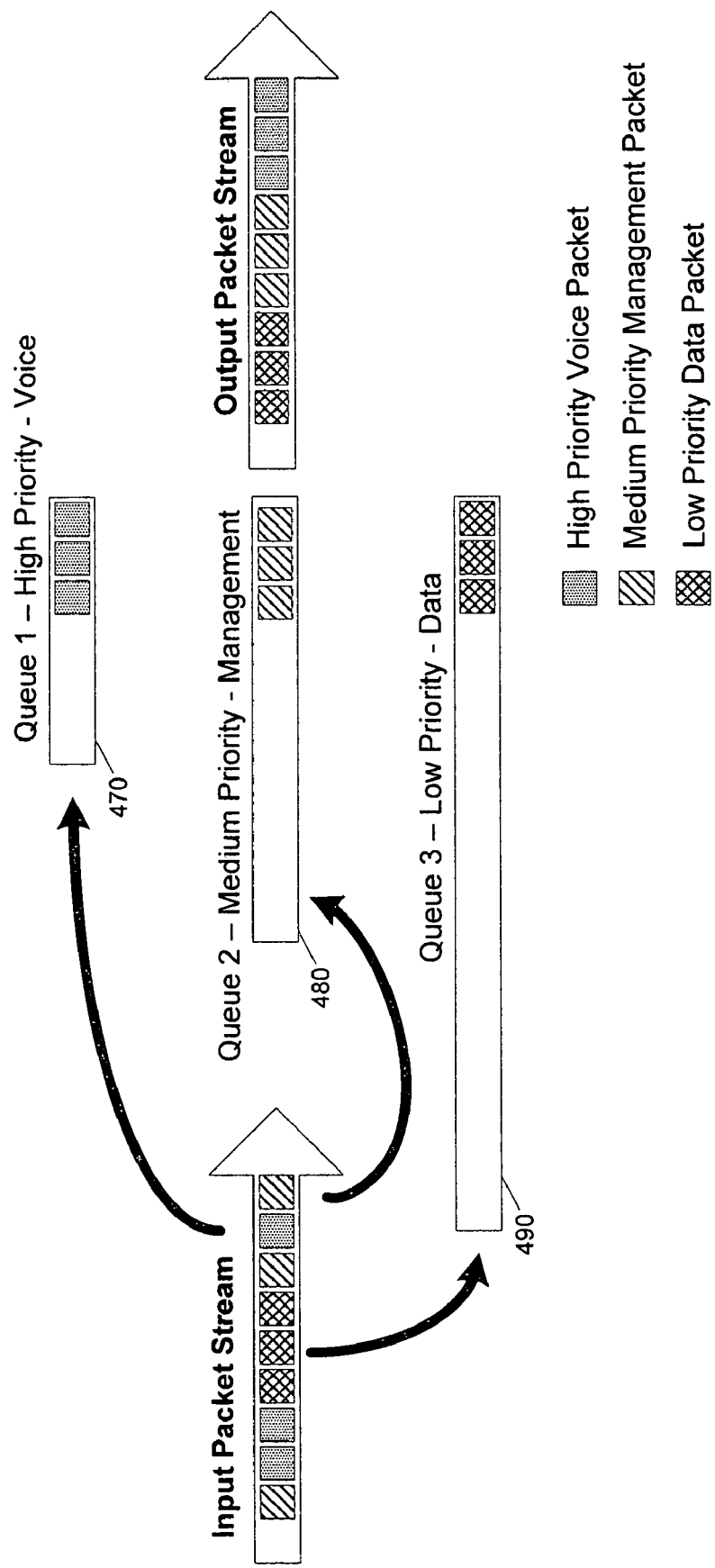
FIG. 4 illustrates an example of multiple data packet queues that they may be used to prioritize data according to an example embodiment of the present invention.

FIG. 4 illustrates the multiple packet queues 470, 480, 490 of FIG. 3. In this example, the input stream may include low priority data packets (for example, general data packets), medium priority data packets (for example, network management data packets), and high priority data packets (for example, voice data packets) as shown. Thus, in some embodiments each packets of type of data may be placed into different queues. Strict priority queuing, where the highest priority data is always transmitted next may be used, it has the drawback that it may prevent lower priority data packets from ever being transmitted. Therefore, one example embodiment employs weighted priority queuing. A set of weight factors limits the percentage of bandwidth that may be consumed by higher priority data types or classes of service. Thus, in one embodiment, a queue controller 500 may be include a weight factor that controls transmission from the queues. As with the other functions described herein, the algorithm may be implemented via executable program code stored in memory an executable by the processor of the device handling the data packets. The weight factor is used to "promote" a lower priority queue when data packets have been present in that queue for a certain length of time, which may correspond to the number of data packets supplied to the output stream (for ease of discussion herein after referred to as "sent"). This promotion may be referred to as weight reversal. For a particular queue, its weight factor refers to the number of packets that will be transmitted from other queues while packets remain in that queue. When that number of packets has been transmitted, a weight reversal will occur, and a single packet will be transmitted from that queue. The count of the number of data packets sent from other queues will then be reset. The use of the weight factor ensures that transmission from a lower priority queue will not be completely or substantially stopped by the transmission of higher priority data traffic.

Figure 5:
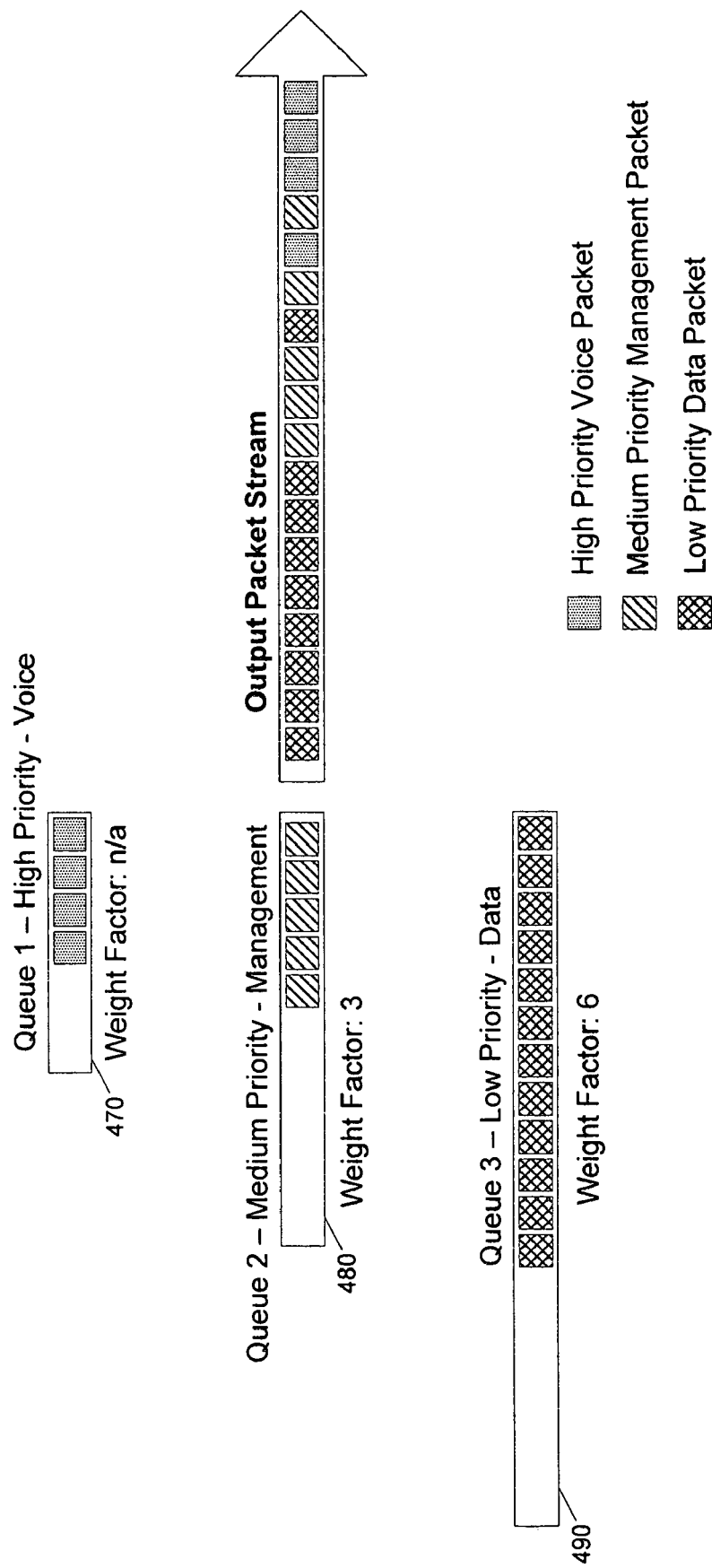
FIG. 5 illustrates an example of multiple data queues and associated weight factors according to an example embodiment of the present invention.

FIG. 5 shows an example of how the weight factors for the queues affect the output stream from the queues. Queue 1 is the high priority queue (e.g., for voice data); queue 2 is a medium priority queue and may handle management data and non-rate limited premium data packets; and queue 3 is the lowest priority queue and may handle general data packets. Queue 1 does not have a weight factor because it is the highest priority queue. Queue 2 has a weight factor of three, and queue 3 has a weight factor of six. Queue 1 is the highest priority queue and data packets from queue 1 are the first to be supplied to the output stream (sent). Once three data packets have been sent from queue 1, queue 2 which has a weight factor of three, now becomes the highest priority queue and sends a data packet. After that data packet is sent, the packet count for queue 2 is reset to zero. Now queue 1 is highest priority again and a queue 1 data packet is sent, which depletes the data packets in queue 1 and allows the next data packet to be sent from queue 2. After this data packet is sent, six data packets will have been sent in total, so queue 3 with a weight factor of six now becomes the highest priority queue and sends a data packet. The next three packets are sent from queue 2 depleting queue 2 and allowing queue 3 to send its next data packets.

Each queue or type or queue may be configured with a specific queue size appropriate for the assigned class of traffic. Default or general data packets continue to have large queues that minimize packet loss and maximize flexibility for variable network conditions. Given the real-time nature of voice traffic, substantially delayed voice packets are of little value and may preferably be dropped in some embodiments rather than consume queuing and bandwidth resources. Accordingly, the queue sizes for voice data packets and other similar data may be configured to be relatively small compared to some other queues. An example of different queue sizes is shown in FIG. 5. In some embodiments, enhanced power distribution service (EPDS) data (e.g., power usage data) and management data may have very large queues so that very little data is dropped.

The queue depths and weighting factors are set to achieve desired performance goals. For example, the queue sizes for a bypass device may be set to fifteen packets for queue 1, 100 packets for queue 2, and 1500 packets for queue 3. The weight factors may be three for queue 2 and six for queue 3. The highest priority queue typically does not have a weight factor. For a backhaul point (or POP) for example, the queue sizes may set to 25 packets for queue 1, 200 packets for queue 2, and 1500 packets for queue 3. The weight factors may be ten for queue 2 and twenty for queue 3. Further, these values may be set the same for all devices in a network, or may be set based upon the number of users of each type of service offered at each bypass device and each backhaul point of the PLC. In other instances, other devices, such as a MV or LV repeater, might not have multiple queues and may simply receive and transmit on a first in first out basis. More queues may be used additional types of data. Some examples would be streaming media data such as music, video, or gaming data. These other data types may have priorities that are higher or lower than voice data and may be implemented in the bypass device 230, the backhaul point 200, MV repeaters, the AP 210, an in-home router, a PLM, and/or the POP. Further, the queues may be organized based upon data type and data class within that data type. Also, queue selection may be simply based upon the data's source or destination address.

Figure 6:
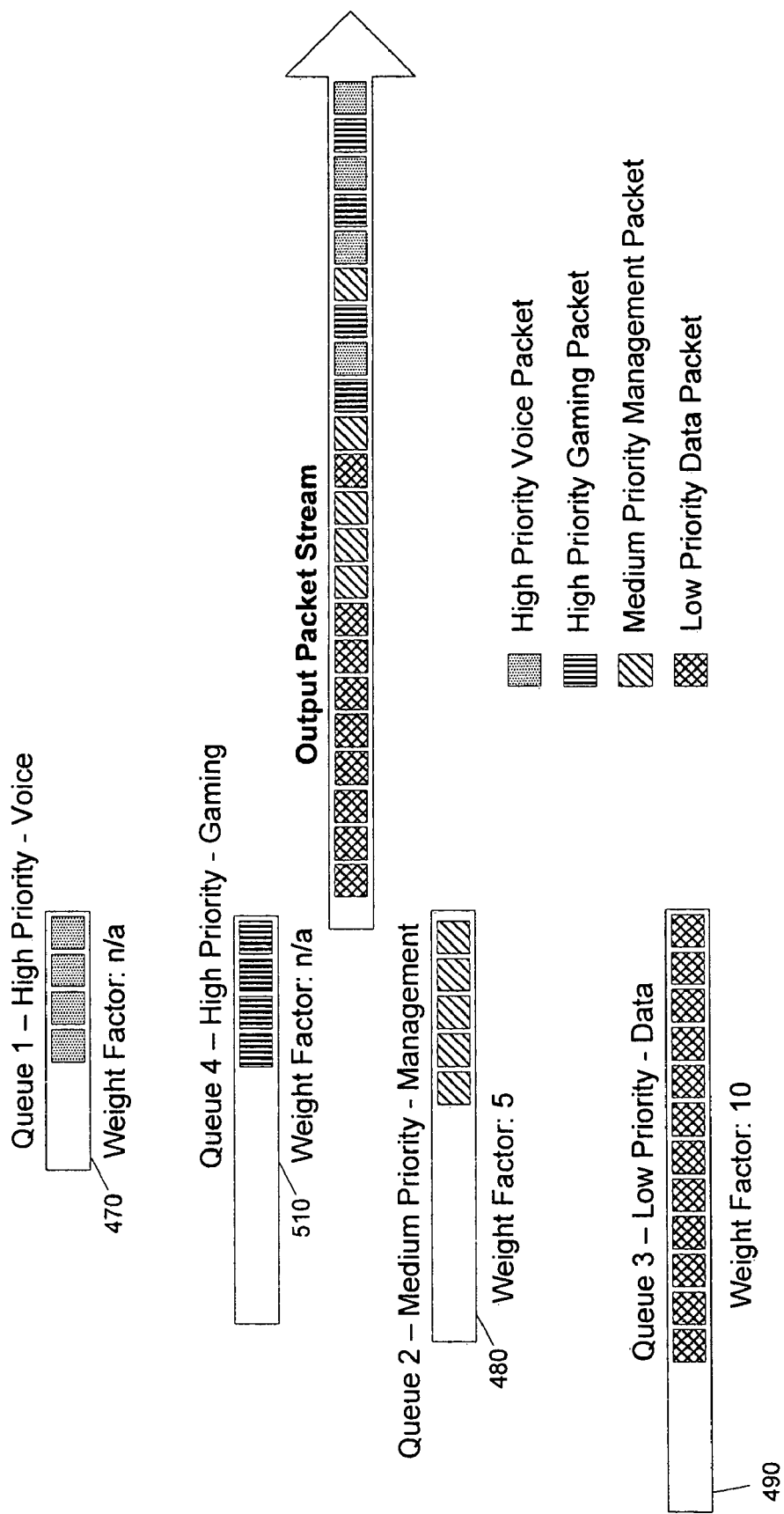
FIG. 6 illustrates another example of multiple data queues and associated weight factors according to an example embodiment of the present invention.

FIG. 6 shows another example implementation of data packet queues. This example is similar to that shown in FIG. 5, but adds a second high priority queue (queue 4) that is larger and with no weight factor (which may be considered to have weight factor equivalent to one). With no weight factor, queue 4 sends one packet for every packet sent by queue 1. In this example, queue 1 may receive voice packets and queue 4 may receive gaming data packets. Because queue 4 is larger it is less likely to drop a packet which is important for gaming data packets, while queue 1 may drop packets from time to time because it is a smaller queue, which is tolerable for voice packets. This embodiment allows for separate queue sizes for data of similar priority. Consequently in this example gaming data and voice data may be prioritized as the same data type but further classified as a different class of data within that data type.

While one specific queuing algorithm is described above, other queuing algorithms may be used in the present invention as well. Such queuing algorithms may include first come first serve (FCFS), priority queuing, fair queuing, weighted fair queuing, stochastic fair queuing (SFQ), deficit round robin (DRR), deficit round robin+ (DRR+) queuing, self-clock fair queuing (SCFQ), start-time fair queuing (STFQ), worst-case fair weighted fair queuing (WF2Q), frame-based fair queuing (FFQ), earliest deadline first (EDF), class based queuing (CBQ), and hierarchical packet fair queuing (HPFQ). These various queuing algorithms are well known in the art. The different algorithms achieve various performance levels with different levels of complexity and cost to implement. The types of data and the processing capabilities, cost, available memory to implement the algorithm, and other factors may determine which queuing algorithm to implement. Further, because such algorithms may be implemented in software on a processor, more than one queuing algorithm may be available in a network element, and a network element may select from more than one queuing algorithm and/or may select the number and size of the queues based upon the specific needs of the network element, the types of services users have subscribed to, etc. The selection may be self-determined by the network element or transmitted from the PLS or other remote device.

In typical communication networks, various segments of the network may not use the same transmission format and protocol. Therefore, it may be desirable to set the data priority at or near entry into the network (at an ingress point) so that the priority value remains with the data throughout the network to provide information to the network elements to allow them to handle the data appropriately.

In the PLCS illustrated in FIG. 2, the data packets may be transmitted from a user device (i.e., game system 100, VoIP endpoint 110, digital cable box 120, computer 130, etc.) to the PLM 240 using Ethernet. From the PLM 240 to the bypass device 230, and to the backhaul point 200, the data packets may be transmitted using a HomePlug® standard (e.g., Homeplug 1.0 or A/V). The link from the backhaul point 200 to the AP 210 may use Ethernet again. Then from the AP 210 to the IP network 130 another protocol may be used over a fiber optic network, such as for example, the SONET protocol. Each of these different protocols use different priority schemes and may even differentiate data (e.g., tag data) at different layers, i.e., layer 2 versus layer 3. Therefore, when high QOS VoIP or other such data service is desired, the data packets must be identified and assigned a higher priority according to the protocols of each network segment.

By way of illustration using the system of FIG. 2, voice data packets may be generated by the VoIP endpoint 110 and transmitted to the PLM 240 using Ethernet. The voice data packets may have a priority set according to the differentiated services (DiffServ) model as defined by IETF RFCs 2474 and 2475. High quality and high priority voice traffic may be tagged and handled though the network as expedited forwarding (EF) class of traffic (as defined in IETF RFC 2498.) In the first embodiment described above, the bypass device, backhaul, AP, and/or POP may set the DiffServ tag and IEEE 802.1p priority based on the IP address (source or destination) of the data packet. The voice data packets become part of the data payload of an Ethernet frame.

However, Ethernet segments do not process or recognize the DiffServ priority included in the IP header of the IP data packets (layer 3) in its data frames, so in another example embodiment the VoIP endpoint 110 may set the priority of the Ethernet frames carrying the voice data packets to an appropriate level to achieve the desired voice QOS. The IEEE specification that defines Ethernet frames calls for 802.1p priority tagging. This tag is three bits long allowing for eight priority levels. IEEE guidelines recommend transmitting voice data packets with a priority level of six, therefore the VoIP endpoint transmits the voice packets over the Ethernet link with an 802.1p priority of six.

Continuing the example, the PLM 240 receives the Ethernet frames containing the voice packets. In the present example, it is assumed that the PLM 240 uses a HomePlug® standard, but other standards may be used as well. The Home-Plug 1.0 standard has four different priority levels for data, namely CA0, CA1, CA2, and CA3. The HomePlug standard maps data with an 802.1p priority of six to HomePlug priority of CA3. In the present example, the voice packets are transmitted using a HomePlug standard from the PLM 240 to the bypass device 230 and then to the backhaul point 200. The bypass device 230 and backhaul point 200 expedite the voice packets with a priority of CA3 and DiffServ tag of EF versus those with lower priorities.

In the present example, the backhaul point 200 may receive voice data packets from the MV power line in a Homeplug standard format and may transmit them to the AP 210 via a different format and protocol such as wireless, Ethernet, or SONET. The transmitted data packets preferably are tagged with an appropriate priority level for the backhaul link in order to maintain QOS for the data packets. For example, in one embodiment the backhaul point 200 may communicate with the AP 210 or POP 220 using Ethernet in which case the backhaul point may set the IEEE 802.1p priority to 6 for upstream voice data packets. Upon receipt of the packets, the AP or POP may set tags in the data packets (if necessary) to allow the receiving external network device to handle the packets appropriate, which may include setting the IEEE 802.1p priority to 6 for voice data packets for upstream data packets and may also set the DiffServ tag to EF. Of course, if the DiffServ tag or IEEE 802.1p priority tag was set for the upstream data packet was set by the user device or bypass device and is preserved, the backhaul point, AP and POP may not need to set the DiffServ or IEEE 802.1p priority tag. For downstream data, the AP or POP may set the IEEE 802.1p priority to 6 for voice data packets and may also set the DiffServ tag to EF. Upon receiving the downstream packets, the backhaul point and bypass devices preferably need not to set the DiffServ tag (as they may have been previously set and are maintained) or the IEEE 802.1p priority (e.g., set to 6 for voice data packets).

In a second embodiment of the present invention, instead of using IP addresses of the user devices to identify the device associated with a data packet in order to the tag data packet, each user device may be configured to tag the data packets. For example, each user device (e.g., an ATA) may be configured to set the priority for its data packets to the appropriate IEEE 802.1p priority (e.g., priority 6 for voice data packets) and to set the DiffServ tag appropriately (e.g., to EF for voice data packets). The Ethernet packets are supplied to the Home-Plug modem. The IEEE 802.1p priority causes the PLM to assign the data packet a HomePlug priority (e.g., IEEE 802.p priority 6 packets are set to HomePlug priority CA3). In this embodiment, the bypass device and backhaul point may not need to inspect IP addresses (except perhaps to verify the correct tag setting) and may use the DiffServ tag and/or the IEEE 802.1p priority tag to determine priority and queuing. However, in this second embodiment the AP and/or POP may tag the data packets as described above.

The above example shows the need for mapping priority schemes as the voice packets move through the system. In other PLCS implementations other communication protocols may be used, and priority mapping will have to be done for these protocols to allow for the voice packets to have high priority handling.

The above example also illustrates the priority mapping that may be necessary in a PLCS system that carries voice traffic. As the voice traffic flows from the ATA 110 to the PLM 240, onto the low voltage power line, through the bypass device 230, onto the medium voltage power line, and then into a backhaul point 200, different transmission schemes and data formats may be used. As a result different priority schemes may be found at different places throughout the system. Therefore, the priority values for the data must be mapped from one scheme to another as needed. Particularly, high priority data traffic typically needs to be given a high priority value so that the high priority data traffic is not delayed in the system.

As discussed, data packets may also be tagged external to the PLCS, and the PLCS may use those data tags to differentiate data. In the case of external data tagging, the PLCS may verify the data tags of data packets entering the system. Also, the PLCS may tag incoming data or tag data prior to entering a potentially oversubscribed or expensive portion of the PLCS where it is valuable to discriminate traffic. In one example, the data tagger 410 of the bypass device 230 may verify the tag of the data packet based upon the source address of the data packet such as the MAC or IP address of the device providing the data packet. This requires the bypass device 230 to receive information identifying the various user devices and their association with a specific service subscription. Alternately, the PLM 240 may provide this verification functionality. For data entering the PLCS from an external network, the backhaul point 200, AP, or POP may verify the tag as the data is received from the external network.

Providing differentiated services not only allows for different types of services to be handled on the PLCS, but also allows for different quality levels of a service to be offered. For example, different levels of voice service may be offered, allowing for a high quality but higher priced service and a low quality but lower priced service.

Finally, if it is desirable to have different levels of service for a different data type, the system may employ different types of tagging for the different data packets and different queues for each class of data (for a level of service) for some data types. For example, in descending order of QOS a PLCS provider may offer a business voice data service, a premium residential voice service, and a normal residential voice service. Each of these voice services may have a differently weighted queue in the bypass devices, repeaters, and backhaul points, APs and/or POP. These devices may also include other queues for the management, premium, and general data packets as discussed above. The classification and queuing may be accomplished via the address (MAC or IP) of the source (for upstream data) or destination (for downstream data) device and/or may be tagged appropriately by the end user device or other ingress point (e.g., setting the DiffServ tag and/or the IEEE 802.1p priority).

The system and methods described above allow network operators to define, deliver, and manage a variety of services that each may require unique handling across the network. Further, as a PLCS interconnects with external networks like the internet, the QOS of data transport may be controlled on the PLCS so that an end to end QOS may be provided to a subscriber to the PLCS. For high QOS data services, the PLCS may choose to route the high QOS data traffic to dedicated networks that provide the necessary performance, thus assuring the end to end QOS. Overall QOS data requirements may dictate QOS data requirements for the PLCS and any external IP network. The system and methods of the present invention may be used to achieve the QOS required of the PLCS.

As discussed, one type of data traffic that benefits from differentiated services is management data. The PLCS may be used to help monitor and manage the power distribution system. This may include monitoring and reporting voltage and electric current levels, controlling switches and capacitor banks, performing automatic meter reading, etc. This type of data typically needs to be highly reliable and in some cases very timely. For example if a switch needs to be actuated in response to a problem, this may need to be done with a minimum amount of delay. Such a command may be sent with the highest possible priority. Meter reading data and other monitoring data is much less time sensitive, but needs to be very accurate and reliable. The present invention allows a network operator to tailor the way such data traffic is handled in the PLCS, so that the desired communication performance is achieved. A separate class or classes of data traffic may defined for management data and for different types of management data.

The PLS provides overall management of the PLCS and may be used to control the provision of differentiated data services to supply the required QOS. The PLS may provide information to various network elements (typically, backhaul points 200 and bypass devices 230, but may include other devices such as APs, POPs, and MV and LV repeaters) in order to provide differentiated services to users based upon their service subscription. The PLS may set the configurations, parameters, and priorities used by the network elements in accordance with the needs of the users attached to each network element. As the network changes, as users are added or deleted, as users add new devices, and/or as new services are provided, the PLS may provide the information to the affected network elements to adapt to the changes by transmitting such information to the network element over the PLCS (e.g., over the MV power lines for bypass devices 230 and repeaters). The network elements may then store and implement the new parameters and/or software application code.

Figure 7:
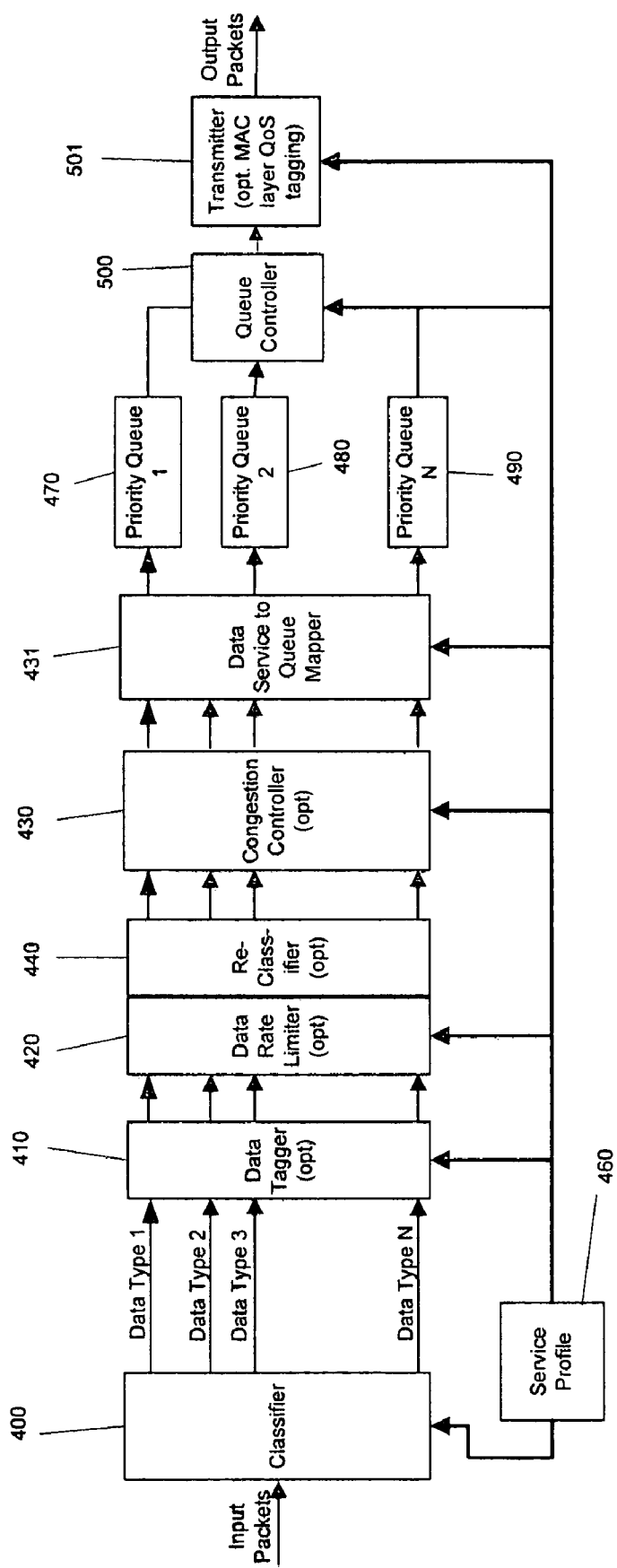
FIG. 7 illustrates a functional block diagram of another example embodiment for implementing the processing of data packets in accordance with the present invention.

FIG. 7 illustrates a functional block diagram of another implementation for handling data packets in a network element (e.g., bypass device 230) to provide differentiated data services in a PLCS in accordance. The functional blocks of FIG. 7 function in substantially the same fashion as the similarly named and numbered functional blocks of FIG. 3. However, as more explicitly shown in FIG. 7, many of the functional blocks may be omitted depending on the network design. In addition, FIG. 7 explicitly shows the Data Service to queue mapper 431, which determines to which queue each packet should be placed. Additionally, this embodiment includes a transmitter 501 that may perform MAC layer QoS tagging.

Figure 8:
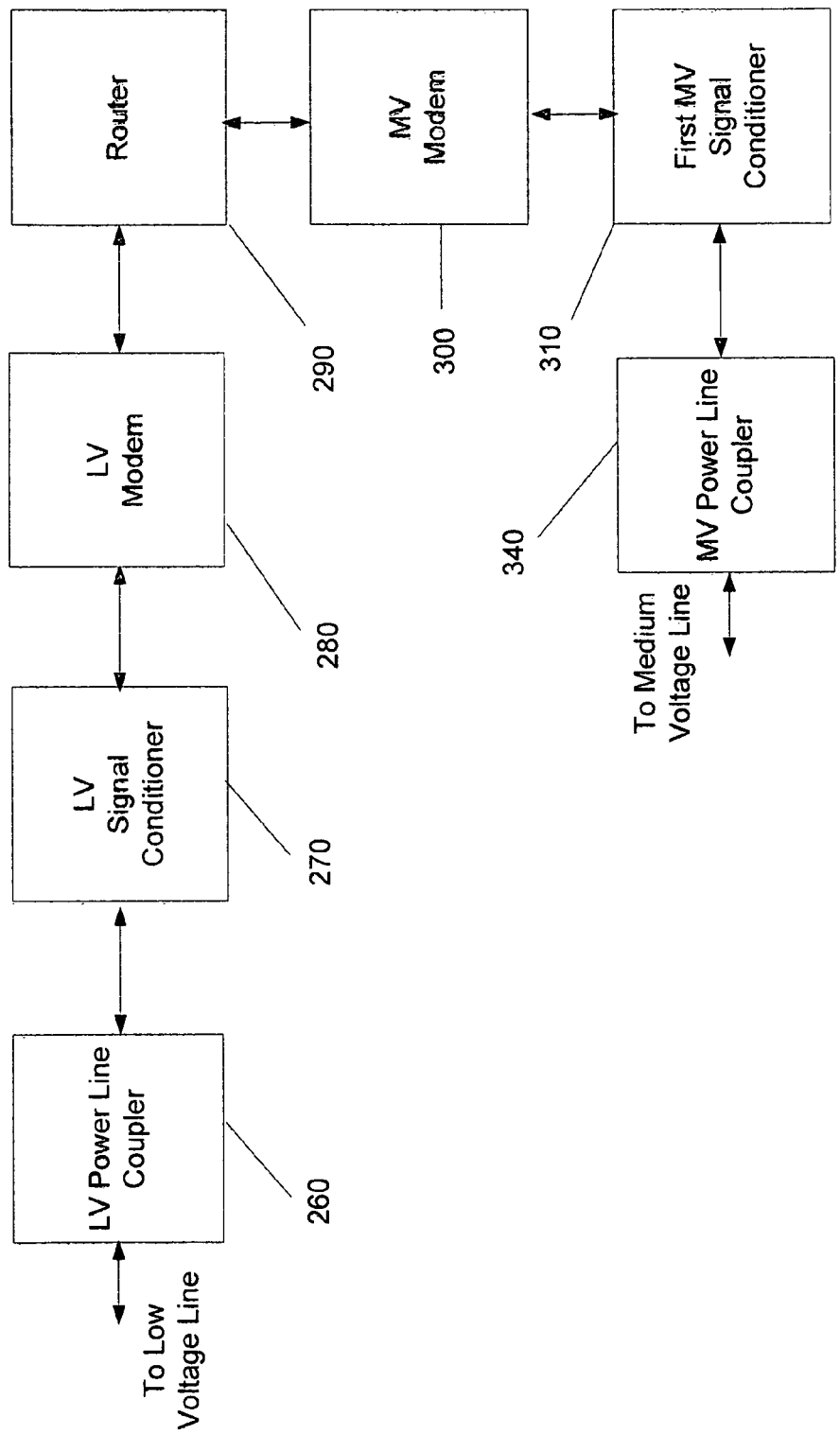
FIG. 8 illustrates an example embodiment of a bypass device that may be used to implement the present invention.

FIG. 8 shows an example embodiment of a bypass device 230. The bypass device 230 may include a LV power line coupler 260, a LV signal conditioner 270, and a LV modem 280. The router 290 may form a part of a controller and performs routing functions. Router 290 may perform routing functions using layer 3 data (e.g., IP addresses), layer 2 data (e.g., MAC addresses), or a combination of layer 2 and layer 3 data (e.g., a combination of MAC and IP addresses). The bypass device 230 may also include a MV modem 300, a first MV signal conditioner 310, and a power line coupler 340. In addition to routing, the controller may perform other functions including those shown in FIG. 3 and controlling the operation of the bypass device 230 functional components. In other embodiments, the bypass device 230 may perform layer 2 bridging.

As discussed, this embodiment of the present invention provides bi-directional communications around the distribution transformer to thereby provide a first communications path from the LV power line to the MV power line and a second path from the MV power line to the LV power line. For ease of understanding, the processing, and functional components of a communication path from the LV power line to the MV power line (the LV to MV path) will be described. The communication path from the MV power line to the LV power line (the MV to LV path) operates in the opposite direction in a similar manner and will not be described.

As will be evident to those skilled in the art, the two paths are logical paths. The LV to MV path and the MV to LV path may be separate physical electrical paths at certain functional blocks and may be the same physical path in other functional blocks. However, other embodiments of the present invention may provide for a completely, or substantially complete, separate physical path for the LV to MV and the MV to LV paths.

In the United States, the LV power line typically includes a neutral conductor and two conductors carrying current ("hot" conductors). In the United States, the two hot conductors typically carry about 120V alternating current (AC) at a frequency of 60 Hz and are 180 degrees out of phase with each other.

The bypass device 230 includes a LV power line coupler 260 that couples data to and from the LV power line. The coupler 260 also may couple power from the LV power line, which is used to power at least a portion of the bypass device 230.

In other embodiments, the LV coupler 260 may include a transducer and may be an inductive coupler such as a toroidal coupling transformer or a capacitive coupler, for coupling data to and/or from the LV power line.

In this embodiment, the signals entering the bypass device 230 are processed with conventional transient protection circuitry, which is well-known to those skilled in the art. The data signals in this embodiment "ride on" (i.e., are additive of) the low frequency power signal (the 120V 60 Hz voltage signal). Consequently, in this embodiment, it is desirable to remove the low frequency power signal, but to keep the data signals for processing, which is accomplished by the voltage translation circuitry. The voltage translation circuitry may include a high pass filter to remove the low frequency power signal and may also (or instead) include other conventional voltage translation circuitry.

Next, the data signals may be processed with impedance translation circuitry, which is well-known in the art. In this embodiment, it is desirable to substantially match the impedance of the LV power line. One method of matching the impedance of the LV power line is to separately terminate the bypass device LV conductors through a termination resistor to ground. The value of the termination resistor may be selected to match the characteristic impedance of the LV power line.

The bypass device 230 may include a battery backup for operating the bypass device 230 during power outages. Thus, a backup power system (which may include a battery) may allow the device to detect a power outage and communicate information relating to the outage to the utility company. The backup power system also may allow the bypass device 230 to communicate certain data packets during a power outage. For example, during an outage, the bypass device 230 may be programmed to communicate all voice data or only emergency voice transmissions (e.g., phone calls dialed to 911), which may require the controller to inspect the destination telephone numbers of one or more packets to determine the destination of the telephone call when there is a power outage.

Once the LV power line coupler 260 couples the signals (both power and data) from the LV power line, the data signals are provided to the LV signal conditioner 270. The LV signal condition 270 conditions the data signal using filtering, automatic gain control, and other signal processing to compensate for the characteristics of the LV power line. For example, the data signal may be filtered into different bands and processed.

The output of the LV signal conditioner 270 is supplied to the LV modem 280, which includes a modulator and demodulator. The LV modem 280 also may include one or more additional functional sub-modules such as an Analog-to-Digital Converter (ADC), Digital-to-Analog Converter (DAC), a memory, source encoder/decoder, error encoder/decoder, channel encoder/decoder, MAC (Media Access Control) controller, encryption module, and decryption module. These functional sub-modules may be omitted in some embodiments, may be integrated into a modem integrated circuit (chip or chip set), or may be peripheral to a modem chip. In the present example embodiment, the LV modem 280 is formed, at least in part, by part number INT51X1, which is an integrated power line transceiver circuit incorporating most of the above-identified sub-modules, and which is manufactured by Intellon, Inc. of Ocala, Fla.

The incoming signal from the LV signal conditioner 270 may be supplied to the LV modem and demodulated. The LV modem 280 then provides decryption, source decoding, error decoding, channel decoding, and media access control (MAC) all of which are known in the art and, therefore, not explained in detail here.

With respect to MAC, however, the LV modem 280 may examine information in the packet to determine whether the packet should be ignored or passed to the router 310. For example, the modem 280 may compare the destination MAC address of the packet with the MAC address of the LV modem 280 (which is stored in the memory of the LV modem 280). If there is a match, the LV modem 280 removes the MAC header of the packet and passes the packet to the router 310. If there is not a match, the packet may be ignored.

The data packet from the LV modem 280 may be supplied to the router 310, which may form a part of the controller. The router 310 performs prioritization, filtering, packet routing, access control, and encryption.

As discussed above, in one embodiment, the router (or bridge) may inspect the IP source address (for upstream data packets) or IP destination address (for downstream data packets) and set priority tag(s) of the data packets accordingly. For example, if the source address of the upstream data packet corresponds to a VoIP endpoint, the router may set the IEEE 802.1p priority to 6 and set the DiffServ priority to EF. In a second embodiment, the DiffServ tag may have already been set (e.g., by the end user device) and the therefore the source and destination addresses may not need to be inspected. In either embodiment, the bypass device may provide classification, tagging (if necessary), queuing and the other functions described in conjunction with, and shown in, FIG. 3.

The router 310 of this example embodiment of the present invention uses a table (e.g., a routing table) and programmed routing rules stored in memory to determine the next destination of a data packet. The table is a collection of information and may include information relating to which interface (e.g., medium voltage or low voltage) leads to particular groups of addresses (such as the addresses of the user devices connected to the customer LV power lines), priorities for connections to be used, and rules for handling both routine and special cases of traffic (such as voice packets and/or control packets).

The router 310 will detect routing information, such as the destination address (e.g., the destination IP address) and/or other packet information (such as information identifying the packet as voice data), and match that routing information with rules (e.g., address rules) in the table. The rules may indicate that packets in a particular group of addresses should be transmitted in a specific direction such as through the LV power line (e.g., if the packet was received from the MV power line and the destination IP address corresponds to a user device connected to the LV power line), repeated on the MV line (e.g., if the bypass device 230 is acting as a repeater), or be ignored (e.g., if the address does not correspond to a user device connected to the LV power line or to the bypass device 230 itself).

As an example, the table may include information such as the IP addresses (and potentially the MAC addresses) of the user devices on the bypass device's LV subnet, the MAC addresses of the PLMs 240 on the bypass device's LV subnet, the MV subnet mask (which may include the MAC address and/or IP address of the bypass device's backhaul point 230), and the IP address of the LV modem 280 and MV modem 300. Based on the destination IP address of the packet (e.g., an IP address), the router may pass the packet to the MV modem 300 for transmission on the MV power line. Alternately, if the IP destination address of the packet matches the IP address of the bypass device 230, the bypass device 230 may process the packet as a request for data.

Similar to the LV modem 280, the MV modem 300 receives data from the router 310 and includes a modulator and demodulator. In addition, the MV modem 300 also may include one or more additional functional sub-modules such as an ADC, DAC, memory, source encoder/decoder, error encoder/decoder, channel encoder/decoder, MAC controller, encryption module, and decryption module. These functional sub-modules may be omitted in some embodiments, may be integrated into a modem integrated circuit (chip or chip set), or may be peripheral to a modem chip. In the present example embodiment, the MV modem 300 is formed, at least in part, by part number INT51X1, which is an integrated power line transceiver circuit incorporating most of the identified sub-modules and which is manufactured by Intellon, Inc. of Ocala, Fla.

The incoming signal from the router 310 (or controller) may be supplied to the MV modem 300, which provides MAC processing, for example, by adding a MAC header that includes the MAC address of the MV modem 300 as the source address and the MAC address of the backhaul point 230 (and in particular, the MAC address of the MV modem of the backhaul point) as the destination MAC address. In addition, the MV modem 300 also provides channel encoding, source encoding, error encoding, and encryption. The data may then be modulated and provided to the DAC to convert the digital data to an analog signal. Again, the input data packet may have an IEEE 802.1p priority (e.g., priority 6 for voice data packets) which may be converted by the modem to a HomePlug priority (CA0-CA3).

The modulated analog signal from MV modem 300 is provided to the MV signal conditioner 310, which may provide filtering (anti-alias, noise, and/or band pass filtering) and amplification. In addition, the MV signal conditioner 310 may provide frequency translation. In this embodiment, translation of the frequency is accomplished through the use of a local oscillator and a conversion mixer. This method and other methods of frequency translation are well known in the art and, therefore, not described in detail.

Data passing through the MV conditioner switch for transmission on the MV power line is supplied to the MV power line coupler 210, which may include impedance translation circuitry, transient suppression circuitry, and a coupling device. The coupling device couples the data onto the MV power line as a transmission.

The MV coupling device 340 may be inductive, capacitive, conductive, a combination thereof, or any suitable device for communicating data signals to and/or from the MV power line. One example of such a coupler is described in U.S. application Ser. No. 10/348,164, and entitled "Power Line Coupling Device and Method of Using the Same," filed Jan. 21, 2003, which is hereby incorporated by reference in its entirety.

Another example of such a suitable MV coupler is described in U.S. application Ser. No. 10/292,714, entitled "A Power Line Coupling Device and Method of Using the Same," filed Nov. 12, 2002, which is hereby incorporated by reference in its entirety. This coupler itself provides isolation by using the isolation provided by a standard underground residential distribution MV cable (although it may be used in an underground or overhead application).

Figure 9:
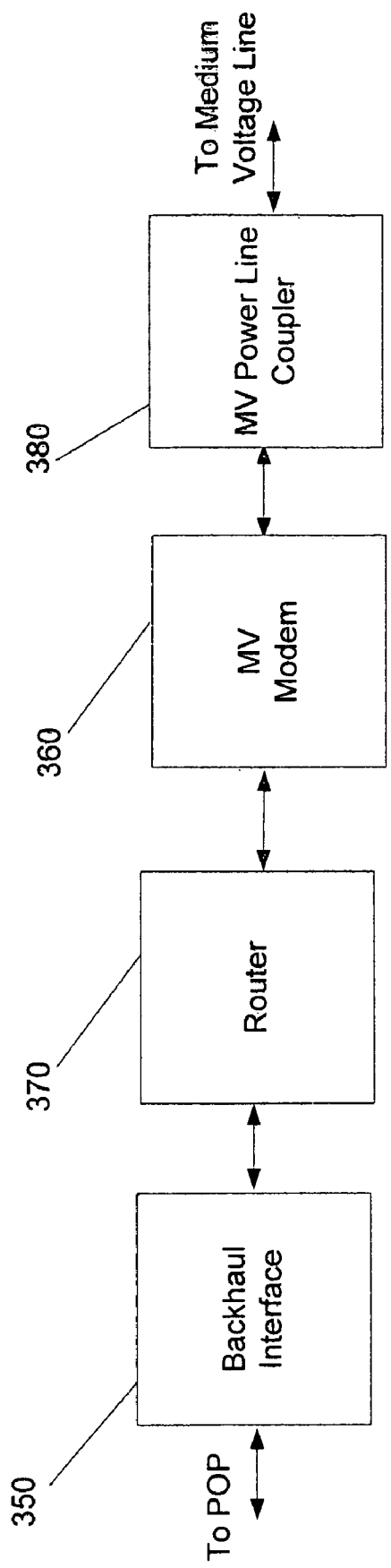
FIG. 9 illustrates an example embodiment of a backhaul point that may be used to implement the present invention.
Figure 10:
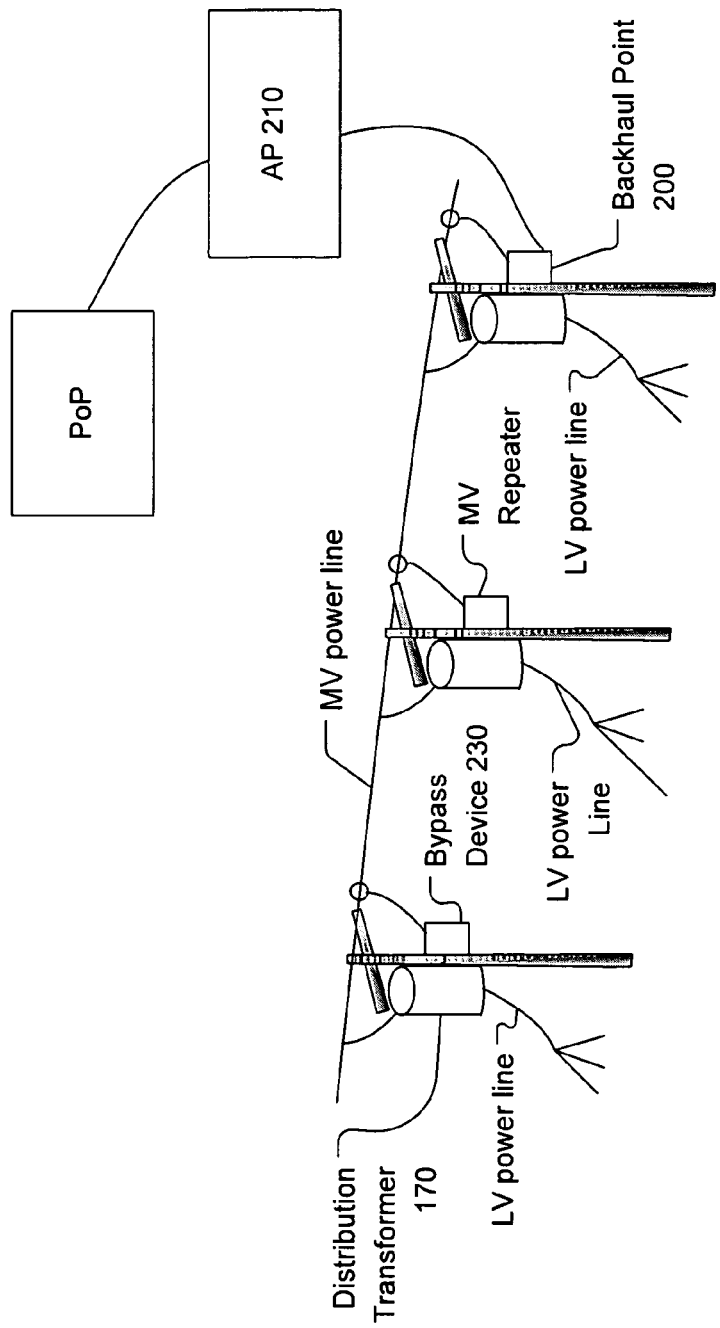
FIG. 10 illustrates a system that may be used to implement example embodiments of the present invention.

FIG. 9 shows a block diagram of an example backhaul point. The backhaul point communicates with the outside world, typically the IP network, via the POP 220. The backhaul to the POP 220 may utilize any type of technology, such as for example, optical fiber, coaxial cable, copper, or a wireless link. The backhaul interface 350 may include a modem (e.g., a wireless or fiber optic transceiver) and connect the non-power line network to the MV modem 360 such as, for example, via a router 370. The MV modem 360 modulates/demodulates the data so that it may be transmitted over the MV cable. Data packets from the MV power line in this embodiment will have a HomePlug priority as supplied by the bypass device or MV repeater. The router (or bridge) of the backhaul point may classify, tag, and queue data packets (and perform many of the other functions of FIG. 3) according to (1) the source or destination address or (2) according to the DiffServ tag present and (a) HomePlug tag (for upstream data traffic) and (b) IEEE 802.1p priority tag (for downstream Ethernet data traffic). In some embodiments, the backhaul point may set the DiffServ tag based on the IP address or other information.

The MV coupler 380 is used to prevent the medium voltage power passing from the MV line to the rest of the backhaul point's circuits 350, 360, and 370, while allowing the communications signal to pass to/from the backhaul point 200 from/to the MV power line. This coupler may be the same as the MV coupler 340 described above. The above system employs time division multiplexing in a peer to peer architecture. Other embodiments may employ a master slave time division multiplexing protocol system. Additionally, the present invention is suitable for the power line communications systems installed on an underground power distribution system such as, for example, the example system incorporated herein by reference above. This example system employs frequency division multiplexing and amplification at the transformer communication nodes.

In an alternate embodiment, the intermediate communication devices (e.g., communication nodes located at the same location and performing substantially the same functionality as the backhaul point and transformer bypass devices described above) may be coupled to a conventional telecommunications medium such as a fiber optic cable, a coaxial cable, an Ethernet cable, a twisted pair, power line neutral conductor, a wireless link, or other non-energized power line communications medium instead of a MV power line. The conventional telecommunications medium may traverse substantially parallel to the power lines. Instead of an OFDM modem, a cable modem may be used for communications between the intermediate devices.

In one application of the present invention, the PLCS operator may allow data packets, such as VoIP packets or streaming video data packets, that are being provided to a subscriber of the PLCS service, to have higher priority. Such priority may be provided only to those users who pay for the additional priority or only to those data providers who pay for the higher priority through the PLCS. As discussed above, the classifying of such packets may therefore be based on the destination address (e.g., the user address) or the source address of the data provider (e.g., the video provider). Data to and/or from other data providers, such as those VoIP or video providers not paying for higher priority data services, may be handled as best effort or similarly to general data packets.

Thus, the present invention may be implemented via various embodiments. For downstream data, an ingress point, such as a POP or AP may receive packets, based on the destination IP address or other data, set tags in the data packets such as the DiffServ tag and/or the IEEE 802.1p priority tag. The backhaul point, bypass devices, and repeaters may prioritize and queue the data packets according to the DiffServ tag, the IEEE 802.1p priority tag or both. For upstream data, an ingress point such as a bypass device may similarly inspect IP addresses to set the DiffServ tag and/or the IEEE 802.1p priority tag, which will determine the priority and queuing of data packets by its upstream devices. In a second embodiment, the user device may be the ingress device for upstream data and set the DiffServ tag and/or the IEEE 802.1p priority tag based on configuration information stored therein instead of the bypass device.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended Those skilled in the art, having the benefit of the teachings of this specification, may affect numerous modifications thereto and changes may be made without departing from the scope and spirit of the invention.

What is claimed is:

1. A method of communicating data packets over one or more power lines wherein a first medium voltage (MV) access device is coupled to a medium voltage power line and provides communication services to one or more user devices at one or more customer premises, comprising:
   receiving the data packets from the one or more user devices at the first MV access device;
   determining a data type for the data packets with the first MV access device;
   tagging the data packets with priority information based on the data type with the first MV access device;
   placing each of the data packets in one of a plurality of queues based, at least in part, on the data type of the data packets with the first MV access device;
   selecting a data packet for transmission from one of the plurality of data packet queues with the first MV access device;
   transmitting, from the first MV access device, the tagged data packets over the MV power line according to said selecting;
   receiving the tagged data packets transmitted by the first MV access device at a second device connected to the MV power line; and
   transmitting the received tagged data packets from the second device without tagging the data packets with priority information.

2. The method of claim 1, wherein said determining the data type is based on an address of the data packets.

3. The method of claim 1, further comprising rate limiting at least some of the data packets.

4. The method of claim 3, wherein the rate limiting is based on the data type of the data packets.

5. The method of claim 3, wherein said rate limiting is based, at least in part, on subscriber information.

6. The method of claim 1, wherein said placing the data packets is based upon a priority value associated with the data packet.

7. The method of claim 1, wherein said receiving the data packets at the first MV access device comprises receiving the data packets over a communication link that includes a low voltage power line.

8. The method of claim 1, wherein at least some of the plurality of queues are different in size.

9. The method of claim 1, wherein said receiving the data packets at the first MV access device comprises receiving the data packets over a link that includes a wireless link.

10. The method of claim 1, further comprising mapping a first priority according to a first communication protocol associated with the data packets to a second priority associated with a second communication protocol.

11. The method of claim 1, wherein a first data type comprises voice data packets, the method further comprising rate limiting the voice data packets.

12. A method of providing communications in a power line communications system, comprising:
at a downstream device:
   determining a data type for upstream data packets;
   tagging the upstream data packets with first priority information based, at least in part, on the data type;
   prioritizing transmission of the upstream data packets based, at least in part, on the first priority information of the data packets; and
   transmitting the upstream data packets according to said prioritizing; and at an upstream device:
   determining a data type for downstream data packets;
   tagging the downstream data packets with second priority information based, at least in part, on the data type;
   prioritizing transmission of the downstream data packets based, at least in part, on the second priority information of the data packets; and
   transmitting the downstream data packets according to said prioritizing; and
at an intermediate device disposed in a communication path between said downstream device and said upstream device:
   receiving upstream data packets communicated through the downstream device;
   prioritizing upstream data packets based, at least in part, on the first priority information of the upstream data packets; and
   transmitting the received upstream data packets in accordance with said prioritizing of the upstream data packets without tagging the upstream data packets with priority information.

13. The method of claim 12, further comprising:
at the intermediate device disposed in a communication path between said downstream device and said upstream device:
   receiving downstream data packets communicated through the upstream device;
   prioritizing the downstream data packets based, at least in part, on the second priority information of the downstream data packets; and
   transmitting the downstream data packets according to said prioritizing by the intermediate device and without tagging the downstream data packets with priority information.

14. The method of claim 12, wherein the upstream device comprises an aggregation point.

15. The method of claim 12, wherein the downstream device comprises a medium voltage access device.

16. The method of claim 12, wherein prioritizing by the downstream device comprises:
   placing each of the upstream data packets in one of a plurality of queues based, at least in part, on the data type; and
   selecting a data packet for transmission from one of the plurality of data packet queues.

17. The method of claim 12, wherein the upstream device comprises point of presence.

18. The method of claim 12, wherein determining a data type for upstream data packets comprises determining an address of the upstream data packets and determining a data type associated with the addresses.

* * * * *